(12) United States Patent
Yener et al.

(10) Patent No.: US 9,017,439 B2
(45) Date of Patent: Apr. 28, 2015

(54) ABRASIVE PARTICLES HAVING PARTICULAR SHAPES AND METHODS OF FORMING SUCH PARTICLES

(71) Applicant: Saint-Gobain Ceramics & Plastics, Inc., Worcester, MA (US)

(72) Inventors: Doruk O. Yener, Wilmington, MA (US); Jennifer H. Czerepinski, Framingham, MA (US); Sujatha Iyengar, Northborough, MA (US); Michael D. Kavanaugh, North Grafton, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 14/272,400

(22) Filed: May 7, 2014

(65) Prior Publication Data

US 2014/0325916 A1    Nov. 6, 2014

Related U.S. Application Data

(63) Continuation of application No. 13/341,588, filed on Dec. 30, 2011, now Pat. No. 8,758,461.

(60) Provisional application No. 61/428,912, filed on Dec. 31, 2010.

(51) Int. Cl.
*C09K 5/08* (2006.01)
*B24D 3/00* (2006.01)
(Continued)

(52) U.S. Cl.
CPC ............... *C09K 3/1409* (2013.01); *B24D 3/20* (2013.01)

(58) Field of Classification Search
USPC .................................. 51/293, 307, 308, 309
See application file for complete search history.

(56) References Cited

U.S. PATENT DOCUMENTS

| 345,604 A | 7/1886 | Semper |
|---|---|---|
| 1,910,444 A | 5/1933 | Nicholson |

(Continued)

FOREIGN PATENT DOCUMENTS

| CA | 743715 A | 10/1966 |
|---|---|---|
| CH | 685051 A5 | 3/1995 |

(Continued)

OTHER PUBLICATIONS

PCT/US2013/065085 International Search Report mailed Jan. 24, 2014, 1 page.

(Continued)

*Primary Examiner* — James McDonough
(74) *Attorney, Agent, or Firm* — Adam Keser; Abel Law Group, LLP

(57) ABSTRACT

An abrasive article includes a shaped abrasive particle including a body having a first height (h1) at a first end of the body defining a corner between an upper surface, a first side surface, and a second side surface, and a second height (h2) at a second end of the body opposite the first end defining an edge between the upper surface and a third side surface, wherein the average difference in height between the first height and the second height is at least about 50 microns. The body also includes a bottom surface defining a bottom area ($A_b$) and a cross-sectional midpoint area ($A_m$) defining an area of a plane perpendicular to the bottom area and extending through a midpoint of the particle, the body has an area ratio of bottom area to midpoint area ($A_b/A_m$) of not greater than about 6.

21 Claims, 25 Drawing Sheets

(51) Int. Cl.
*B24D 11/00* (2006.01)
*B24D 18/00* (2006.01)
*C09K 3/14* (2006.01)
*B24D 3/02* (2006.01)
*C09C 1/68* (2006.01)
*B24D 3/20* (2006.01)

(56) References Cited

U.S. PATENT DOCUMENTS

| | | | |
|---|---|---|---|
| 2,049,874 A | 8/1936 | Sherk |
| 2,148,400 A | 2/1939 | Crompton, Jr. |
| 2,248,990 A | 7/1941 | Heany |
| 2,290,877 A | 7/1942 | Heany |
| 2,318,360 A | 5/1943 | Benner et al. |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,615,308 A | 10/1971 | Amero |
| 3,619,151 A | 11/1971 | Sheets, Jr. et al. |
| 3,637,360 A | 1/1972 | Ueltz |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Willkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |

(56) References Cited

U.S. PATENT DOCUMENTS

| | | | |
|---|---|---|---|
| 5,273,558 A | 12/1993 | Nelson et al. | |
| 5,277,702 A | 1/1994 | Thibault et al. | |
| 5,282,875 A | 2/1994 | Wood | |
| 5,288,297 A | 2/1994 | Ringwood | |
| 5,300,130 A | 4/1994 | Rostoker | |
| 5,304,331 A | 4/1994 | Leonard et al. | |
| 5,312,789 A | 5/1994 | Wood | |
| 5,312,791 A | 5/1994 | Coblenz et al. | |
| 5,366,523 A | 11/1994 | Rowenhorst et al. | |
| 5,366,525 A | 11/1994 | Fujiyama | |
| 5,372,620 A | 12/1994 | Rowse et al. | |
| 5,373,786 A | 12/1994 | Umaba | |
| 5,376,598 A | 12/1994 | Preedy et al. | |
| 5,376,602 A | 12/1994 | Nilsen | |
| 5,383,945 A | 1/1995 | Cottringer et al. | |
| 5,395,407 A | 3/1995 | Cottringer et al. | |
| 5,409,645 A | 4/1995 | Torre, Jr. et al. | |
| 5,429,648 A | 7/1995 | Wu | |
| 5,431,967 A | 7/1995 | Manthiram | |
| 5,435,816 A | 7/1995 | Spurgeon et al. | |
| 5,437,754 A | 8/1995 | Calhoun | |
| 5,441,549 A | 8/1995 | Helmin | |
| 5,443,603 A | 8/1995 | Kirkendall | |
| 5,447,894 A | 9/1995 | Yasuoka et al. | |
| 5,453,106 A | 9/1995 | Roberts | |
| 5,454,844 A | 10/1995 | Hibbard et al. | |
| 5,470,806 A | 11/1995 | Krstic et al. | |
| 5,479,873 A | 1/1996 | Shintani et al. | |
| 5,482,756 A | 1/1996 | Berger et al. | |
| 5,486,496 A | 1/1996 | Talbert et al. | |
| 5,496,386 A | 3/1996 | Broberg et al. | |
| 5,500,273 A | 3/1996 | Holmes et al. | |
| 5,514,631 A | 5/1996 | Cottringer et al. | |
| 5,516,347 A | 5/1996 | Garg | |
| 5,516,348 A | 5/1996 | Conwell et al. | |
| 5,523,074 A | 6/1996 | Takahashi et al. | |
| 5,525,100 A | 6/1996 | Kelly et al. | |
| 5,527,369 A | 6/1996 | Garg | |
| 5,543,368 A | 8/1996 | Talbert et al. | |
| 5,551,963 A | 9/1996 | Larmie | |
| 5,560,745 A | 10/1996 | Roberts | |
| 5,567,150 A | 10/1996 | Conwell et al. | |
| 5,567,214 A | 10/1996 | Ashley | |
| 5,567,251 A | 10/1996 | Peker et al. | |
| 5,571,297 A | 11/1996 | Swei et al. | |
| 5,576,409 A | 11/1996 | Mackey | |
| 5,578,095 A | 11/1996 | Bland et al. | |
| 5,578,222 A | 11/1996 | Trischuk et al. | |
| 5,582,625 A | 12/1996 | Wright et al. | |
| 5,584,896 A | 12/1996 | Broberg et al. | |
| 5,584,897 A | 12/1996 | Christianson et al. | |
| 5,591,685 A | 1/1997 | Mitomo et al. | |
| 5,593,468 A | 1/1997 | Khaund et al. | |
| 5,599,493 A | 2/1997 | Ito et al. | |
| 5,609,706 A | 3/1997 | Benedict et al. | |
| 5,611,829 A | 3/1997 | Monroe et al. | |
| 5,618,221 A | 4/1997 | Furukawa et al. | |
| 5,628,952 A | 5/1997 | Holmes et al. | |
| 5,641,469 A | 6/1997 | Garg et al. | |
| RE35,570 E | 7/1997 | Rowenhorst et al. | |
| 5,645,619 A | 7/1997 | Erickson et al. | |
| 5,651,925 A | 7/1997 | Ashley et al. | |
| 5,656,217 A | 8/1997 | Rogers et al. | |
| 5,667,542 A | 9/1997 | Law et al. | |
| 5,669,941 A | 9/1997 | Peterson | |
| 5,669,943 A | 9/1997 | Horton et al. | |
| 5,672,097 A | 9/1997 | Hoopman | |
| 5,672,554 A | 9/1997 | Mohri et al. | |
| 5,683,844 A | 11/1997 | Mammino | |
| 5,702,811 A | 12/1997 | Ho et al. | |
| 5,725,162 A | 3/1998 | Garg et al. | |
| 5,736,619 A | 4/1998 | Kane et al. | |
| 5,738,696 A | 4/1998 | Wu | |
| 5,738,697 A | 4/1998 | Wu et al. | |
| 5,751,313 A | 5/1998 | Miyashita et al. | |
| 5,759,481 A | 6/1998 | Pujari et al. | |
| 5,776,214 A | 7/1998 | Wood | |
| 5,779,743 A | 7/1998 | Wood | |
| 5,785,722 A | 7/1998 | Garg et al. | |
| 5,810,587 A | 9/1998 | Bruns et al. | |
| 5,820,450 A | 10/1998 | Calhoun | |
| 5,830,248 A | 11/1998 | Christianson et al. | |
| 5,840,089 A | 11/1998 | Chesley et al. | |
| 5,849,646 A | 12/1998 | Stout et al. | |
| 5,855,997 A | 1/1999 | Amateau | |
| 5,863,306 A | 1/1999 | Wei et al. | |
| 5,866,254 A | 2/1999 | Peker et al. | |
| 5,876,793 A | 3/1999 | Sherman et al. | |
| 5,885,311 A | 3/1999 | McCutcheon et al. | |
| 5,893,935 A | 4/1999 | Wood | |
| 5,902,647 A | 5/1999 | Venkataramani | |
| 5,908,477 A | 6/1999 | Harmer et al. | |
| 5,908,478 A | 6/1999 | Wood | |
| 5,919,549 A | 7/1999 | Van et al. | |
| 5,924,917 A | 7/1999 | Benedict et al. | |
| 5,946,991 A | 9/1999 | Hoopman | |
| 5,975,987 A | 11/1999 | Hoopman et al. | |
| 5,984,988 A | 11/1999 | Berg et al. | |
| 5,989,301 A | 11/1999 | Laconto, Sr. et al. | |
| 5,997,597 A | 12/1999 | Hagan | |
| 6,016,660 A | 1/2000 | Abramshe | |
| 6,019,805 A | 2/2000 | Herron | |
| 6,024,824 A | 2/2000 | Krech | |
| 6,048,577 A | 4/2000 | Garg | |
| 6,053,956 A | 4/2000 | Wood | |
| 6,054,093 A | 4/2000 | Torre, Jr. et al. | |
| 6,080,215 A | 6/2000 | Stubbs et al. | |
| 6,080,216 A | 6/2000 | Erickson | |
| 6,083,622 A | 7/2000 | Garg et al. | |
| 6,096,107 A | 8/2000 | Caracostas et al. | |
| 6,110,241 A | 8/2000 | Sung | |
| 6,129,540 A | 10/2000 | Hoopman et al. | |
| 6,136,288 A | 10/2000 | Bauer et al. | |
| 6,146,247 A | 11/2000 | Nokubi et al. | |
| 6,179,887 B1 | 1/2001 | Barber, Jr. et al. | |
| 6,206,942 B1 | 3/2001 | Wood | |
| 6,228,134 B1 | 5/2001 | Erickson | |
| 6,238,450 B1 | 5/2001 | Garg et al. | |
| 6,258,137 B1 | 7/2001 | Garg et al. | |
| 6,258,141 B1 | 7/2001 | Sung et al. | |
| 6,261,682 B1 | 7/2001 | Law | |
| 6,264,710 B1 | 7/2001 | Erickson | |
| 6,277,160 B1 | 8/2001 | Stubbs et al. | |
| 6,277,161 B1 | 8/2001 | Castro et al. | |
| 6,283,997 B1 | 9/2001 | Garg et al. | |
| 6,284,690 B1 | 9/2001 | Nakahata et al. | |
| 6,287,353 B1 * | 9/2001 | Celikkaya | 51/309 |
| 6,306,007 B1 | 10/2001 | Mori et al. | |
| 6,312,324 B1 | 11/2001 | Mitsui et al. | |
| 6,319,108 B1 | 11/2001 | Adefris et al. | |
| 6,331,343 B1 | 12/2001 | Perez et al. | |
| 6,371,842 B1 | 4/2002 | Romero | |
| 6,391,812 B1 | 5/2002 | Araki et al. | |
| 6,403,001 B1 * | 6/2002 | Hayashi | 264/109 |
| 6,413,286 B1 | 7/2002 | Swei et al. | |
| 6,451,076 B1 | 9/2002 | Nevoret et al. | |
| 6,475,253 B2 | 11/2002 | Culler et al. | |
| 6,524,681 B1 | 2/2003 | Seitz et al. | |
| 6,531,423 B1 | 3/2003 | Schwetz et al. | |
| 6,537,140 B1 | 3/2003 | Miller et al. | |
| 6,579,819 B2 | 6/2003 | Hirosaki et al. | |
| 6,582,623 B1 | 6/2003 | Grumbine et al. | |
| 6,583,080 B1 | 6/2003 | Rosenflanz | |
| 6,599,177 B2 | 7/2003 | Nevoret et al. | |
| 6,646,019 B2 | 11/2003 | Perez et al. | |
| 6,652,361 B1 | 11/2003 | Gash et al. | |
| 6,669,745 B2 | 12/2003 | Prichard et al. | |
| 6,685,755 B2 | 2/2004 | Ramanath et al. | |
| 6,696,258 B1 | 2/2004 | Wei | |
| 6,702,650 B2 | 3/2004 | Adefris | |
| 6,737,378 B2 | 5/2004 | Hirosaki et al. | |
| 6,749,496 B2 | 6/2004 | Mota et al. | |
| 6,755,729 B2 | 6/2004 | Ramanath et al. | |
| 6,843,815 B1 | 1/2005 | Thurber et al. | |

(56) References Cited

U.S. PATENT DOCUMENTS

| | | |
|---|---|---|
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,488,544 B2 | 2/2009 | Schofalvi et al. |
| 7,507,268 B2 | 3/2009 | Rosenflanz |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 * | 7/2011 | Millard et al. ............. 106/287.1 |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 * | 3/2012 | Adefris et al. ................. 51/309 |
| 8,142,532 B2 | 3/2012 | Erickson et al. |
| 8,142,891 B2 | 3/2012 | Culler et al. |
| 8,256,091 B2 | 9/2012 | Duescher |
| 8,480,772 B2 | 7/2013 | Welygan et al. |
| 8,628,597 B2 | 1/2014 | Palmgren et al. |
| 8,783,589 B2 | 7/2014 | Hart et al. |
| 2001/0027623 A1 | 10/2001 | Rosenflanz |
| 2002/0026752 A1 | 3/2002 | Culler et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1 * | 7/2009 | Culler et al. ..................... 51/296 |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2014/0000176 A1 | 1/2014 | Moren et al. |

(56) References Cited

U.S. PATENT DOCUMENTS

| | | |
|---|---|---|
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0290147 A1 | 10/2014 | Seth et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |

FOREIGN PATENT DOCUMENTS

| | | |
|---|---|---|
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0833803 | 8/2001 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2567784 A1 | 3/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| FR | 2354373 A1 | 1/1978 |
| GB | 986847 A | 3/1965 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2002-038131 A | 2/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008194761 A | 8/2008 |
| NL | 171464 B | 11/1982 |
| WO | 9402559 A1 | 2/1994 |
| WO | 95/03370 | 2/1995 |
| WO | 95/18192 A1 | 7/1995 |
| WO | 9520469 A1 | 8/1995 |
| WO | 96/27189 A1 | 9/1996 |
| WO | 9714536 A1 | 4/1997 |
| WO | 9906500 A1 | 2/1999 |
| WO | 99/38817 A1 | 8/1999 |
| WO | 9938817 A1 | 8/1999 |
| WO | 9954424 A1 | 10/1999 |
| WO | 01/14494 A1 | 3/2001 |
| WO | 02097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013/049239 A1 | 4/2013 |
| WO | 2013070576 A2 | 5/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/177446 A1 | 11/2013 |
| WO | 2013/188038 A1 | 12/2013 |
| WO | 2014/005120 A1 | 1/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |

OTHER PUBLICATIONS

"Investigation of Shaped Abrasive Particles vol. 1: Review of US Pat No. 6,054,093 Apr. 25, 2000" © Apr. 2011, 5 pages.

(56) References Cited

OTHER PUBLICATIONS

Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., Journal of Materials Research, 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.
Wu, J. et al., Friction and Wear Properties of Kevlar Pulp Reinforced Epoxy.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, Winter diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Graf, "Cubitron II: Precision-Shaped Grain (PSG) Turns the Concept of Gear Grinding Upside Down," gearsolutions.com, May 2014, pp. 36-44.

* cited by examiner

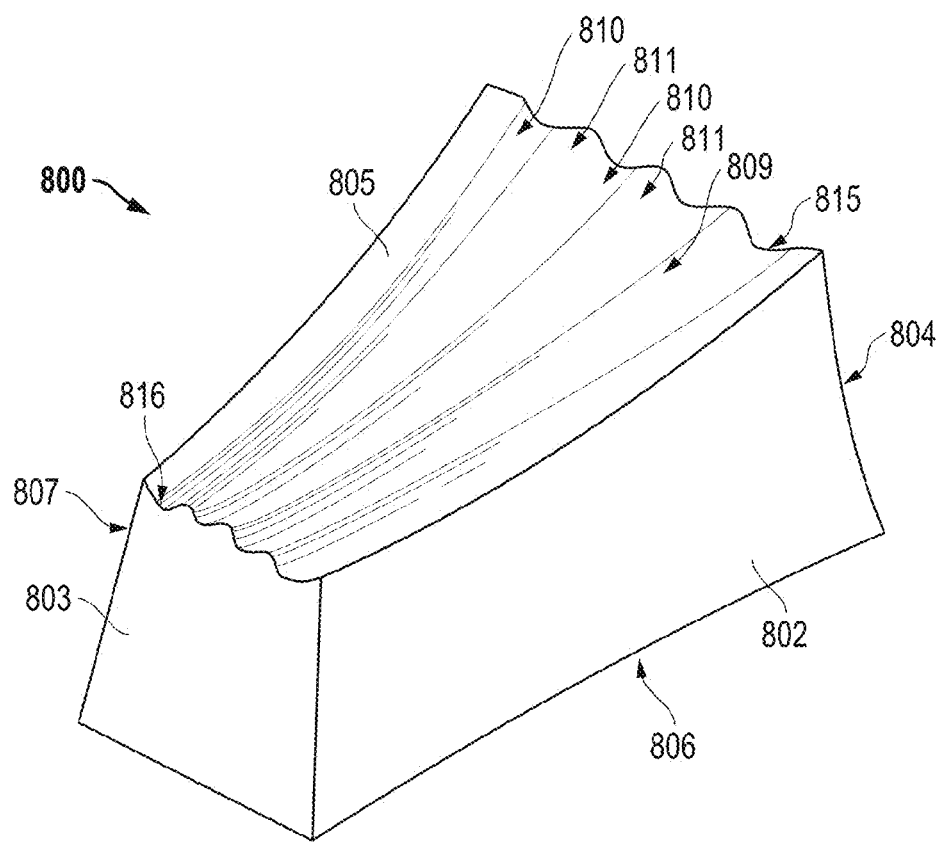
FIG. 8
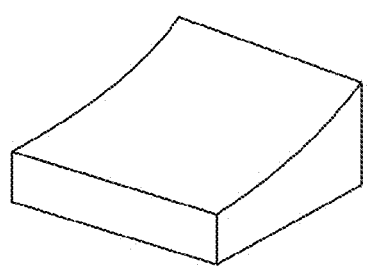 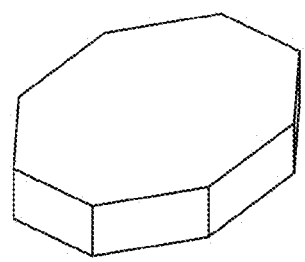
FIG. 9    FIG. 10

ABRASIVE PARTICLES HAVING PARTICULAR SHAPES AND METHODS OF FORMING SUCH PARTICLES

CROSS-REFERENCE TO RELATED APPLICATION(S)

The present application is a continuation of U.S. Non-Provisional patent application Ser. No. 13/341,588, filed Dec. 30, 2011, entitled "Abrasive Particles Having Particular Shapes and Methods of Forming Such Particles," naming inventors Doruk O. Yener et al., which claims priority from U.S. Provisional Patent Application No. 61/428,912, filed Dec. 31, 2010, entitled "Abrasive Particles Having Particular Shapes and Methods of Forming Such Particles," naming inventors Jennifer H. Czerepinski et al., which application is incorporated by reference herein in its entirety.

BACKGROUND

1. Field of the Disclosure

The following is directed to abrasive articles, and particularly, methods of forming abrasive particles.

2. Description of the Related Art

Abrasive particles and abrasive articles made from abrasive particles are useful for various material removal operations including grinding, finishing, and polishing. Depending upon the type of abrasive material, such abrasive particles can be useful in shaping or grinding a wide variety of materials and surfaces in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Three basic technologies that have been employed to produce abrasive particles having a specified shape are (1) fusion, (2) sintering, and (3) chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660, disclosing a process comprising the steps of flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor.

In the sintering process, abrasive particles can be formed from refractory powders having a particle size of up to 10 micrometers in diameter. Binders can be added to the powders along with a lubricant and a suitable solvent, e.g., water. The resulting mixtures, mixtures, or slurries can be shaped into platelets or rods of various lengths and diameters. See, for example, U.S. Pat. No. 3,079,242, which discloses a method of making abrasive particles from calcined bauxite material comprising the steps of (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive grains are produced directly to size.

Chemical ceramic technology involves converting a colloidal dispersion or hydrosol (sometimes called a sol), optionally in a mixture, with solutions of other metal oxide precursors, to a gel or any other physical state that restrains the mobility of the components, drying, and firing to obtain a ceramic material. See, for example, U.S. Pat. Nos. 4,744,802 and 4,848,041.

Still, there remains a need in the industry for improving performance, life, and efficacy of abrasive particles, and the abrasive articles that employ abrasive particles.

SUMMARY

According to a first aspect, an abrasive article includes an abrasive particle comprising a body having a base, an upper surface, and a side surface extending between the upper surface and base, wherein body has a rake angle as defined by the angle between the side surface and the base within a range between about 1° and about 80°.

According to a second aspect, an abrasive article includes an abrasive particle comprising a body, wherein in an upright position the particle comprises a tilted upper surface, and a height of the particle at a first end is significantly different than a height of the particle at a second end.

According to a third aspect, an abrasive article includes an abrasive particle comprising a body having a length (l), width (w), a first height (h1) and a second height (h2), wherein in an upright position, the first height and second height are separated from each other by the length or the width of the body, and wherein the first height is at least about 5% greater than the second height, wherein the height difference is calculate as $\Delta h = [(h1-h2)/h1] \times 100\%$.

In yet another aspect, an abrasive article includes an abrasive particle comprising a body having a length (l), width (w), and height (t), wherein $l \geq w \geq h$, wherein the body has a first height at a first end of the particle, and a second height at a second end of the particle opposite the first end, and the first height and the second height are significantly different from each other. The body also includes an upper surface extending between the first end and the second end, wherein the upper surface having a curvilinear contour.

According to another aspect, a method of forming an abrasive article includes providing a mixture on a substrate, forming the mixture into a shaped abrasive particle comprising a body, wherein in an upright position the particle comprises a tilted upper surface, and a height of the particle at a first end is significantly different than a height of the particle at a second end.

In still another aspect, an abrasive article includes an abrasive particle having a body, wherein in an upright position the particle comprises a tilted upper surface, and a height of the particle at a first end is significantly different than a height of the particle at a second end, wherein the tilted upper surface comprises a texture.

According to one particular aspect, an abrasive article includes a shaped abrasive particle including a body having a first height (h1) at a first end of the body defining a corner between an upper surface, a first side surface, and a second side surface, and a second height (h2) at a second end of the body opposite the first end defining an edge between the upper surface and a third side surface, wherein the average difference in height between the first height and the second height is at least about 50 microns. The body includes a bottom surface defining a bottom area ($A_b$), the body further comprising a cross-sectional midpoint area ($A_m$) defining an area of a plane perpendicular to the bottom area and extending through a midpoint of the particle, the body comprising an area ratio of bottom area to midpoint area ($A_b/A_m$) of not greater than about 6.

In another certain aspect, an abrasive article comprises a shaped abrasive particle including a body having a length (l), a width (w), and a thickness (t), wherein the length≥width and the width≥thickness, wherein the body comprises a two-dimensional shape as viewed in a plane defined by the length and the width of the body selected from the group consisting of ellipsoids, Greek alphabet characters, Latin alphabet characters, Russian alphabet characters, triangles, pentagons, hexagons, heptagons, octagons, nonagons, decagons, and a combination thereof. The body comprises a first height (h1) at a first end of the body defining a corner between an upper surface, a first side surface, and a second side surface, and a second height (h2) at a second end of the body opposite the first end defining an edge between the upper surface and a third side surface, wherein the average difference in height between the first height and the second height is at least about 50 microns.

For yet another aspect, an abrasive article comprises a shaped abrasive particle including a body having a length (l), a width (w), and a thickness (t), wherein the length≥width and the width≥thickness, wherein the body comprises a triangular two-dimensional shape as viewed in a plane defined by a length and a width of the body. The body comprises a first height (h1) at a first end of the body defining a corner between an upper surface, a first side surface, and a second side surface, and a second height (h2) at a second end of the body opposite the first end defining an edge between the upper surface and a third side surface, wherein the average difference in height between the first height and the second height is at least about 50 microns.

According to another aspect, an abrasive article comprises a shaped abrasive particle including a body having a first height (h1) at a first end of the body defining a corner between an upper surface, a first side surface, and a second side surface, and a second height (h2) at a second end of the body opposite the first end defining an edge between the upper surface and a third side surface, wherein the body comprises a normalized height difference defined by the equation $[(h1-h2)/(h1/h2)]$ of at least about 40, wherein h1 is greater than h2. The body comprises a base defining a bottom area ($A_b$), the body further comprising a cross-sectional midpoint area ($A_m$) defining an area of a plane perpendicular to the bottom area and extending through a midpoint of the particle, the body comprising an area ratio of bottom area to midpoint area ($A_b/A_m$) of not greater than about 6.

Still, in one particular aspect, an abrasive article includes a sample of shaped abrasive particle comprising a plurality of individual shaped abrasive particles, each shaped abrasive particle having a body having a first height (h1) at a first end of the body and a second height (h2) at a second end of the body opposite the first end, wherein h1 and h2 are significantly different relative to each other, and wherein the sample comprises a height variation of at least about 20. The body comprises a base defining a bottom area ($A_b$), the body further comprising a cross-sectional midpoint area ($A_m$) defining an area of a plane perpendicular to the bottom area and extending through a midpoint of the particle, the body comprising an area ratio of bottom area to midpoint area ($A_b/A_m$) of not greater than about 6.

According to another aspect, an abrasive article includes an abrasive particle comprising a body having a base, an upper surface, and a side surface extending between the upper surface and base, wherein body has a rake angle as defined by the angle between the side surface and the base within a range between about 1° and about 80°. The body comprises a first height (h1) at a first end of the particle and a second height (h2) at a second end of the particle opposite the first end, and wherein the first height and the second height are significantly different from each other. Additionally, the body comprises a base defining a bottom area ($A_b$), the body further comprising a cross-sectional midpoint area ($A_m$) defining an area of a plane perpendicular to the bottom area and extending through a midpoint of the particle, the body comprising an area ratio of bottom area to midpoint area ($A_b/A_m$) of not greater than about 6.

In another aspect, an abrasive article comprises an abrasive particle including a body having a base, an upper surface, and a side surface extending between the upper surface and base, wherein body includes a two-dimensional shape of a triangle, an area of the base of at least about 30% of the total area of the body, and a first height (h1) at a first end of the particle and a second height (h2) at a second end of the particle opposite the first end, and wherein the first height and the second height are significantly different from each other.

BRIEF DESCRIPTION OF THE DRAWINGS

The present disclosure may be better understood, and its numerous features and advantages made apparent to those skilled in the art by referencing the accompanying drawings.

FIG. 8 includes a perspective view illustration of an abrasive particle in accordance with an embodiment.

FIG. 9 includes a perspective view illustration of an abrasive particle in accordance with an embodiment.

FIG. 10 includes a perspective view illustration of an abrasive particle in accordance with an embodiment.

DETAILED DESCRIPTION

The following is directed to abrasive articles, and more particularly, abrasive particles having particular features, such as polyhedral shapes, shaped surfaces, rake angles, and the like. Additionally, the following details a method of forming such abrasive particles. The abrasive particles according to the embodiments herein may be incorporated into abrasive articles, such as coated abrasives and/or bonded abrasives. Alternatively, the shaped abrasive particles of the embodiments herein may be utilized in free abrasive technologies, including for example grinding and/or polishing slurries.

Figure 1:
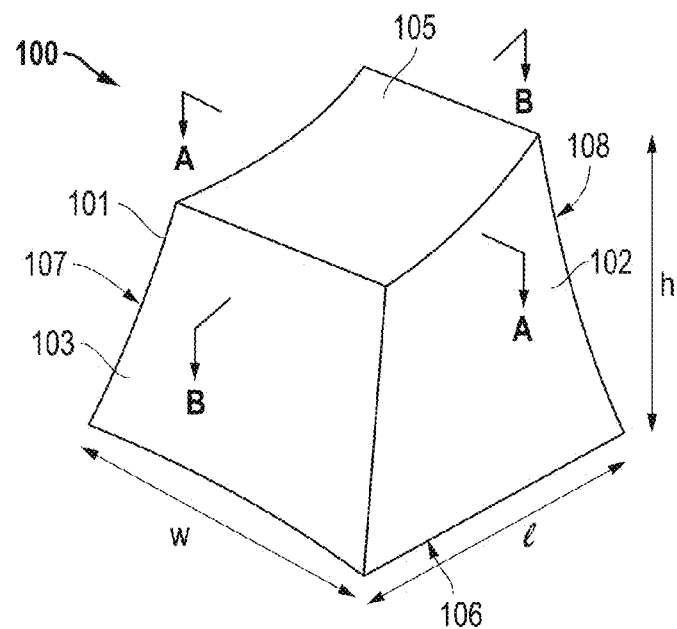
FIG. 1 includes a perspective illustration of an abrasive particle in accordance with an embodiment.

FIG. 1 includes a perspective view illustration of an abrasive particle in accordance with an embodiment. As illustrated, the abrasive particle 100 can have a three-dimensional shape including a body 101 having an upper surface 105 and a bottom surface 106 opposite the upper surface 105. As further illustrated, the body 101 can be formed to have side surfaces 102, 103, 107, and 108 that extend between the upper surface 105 and the bottom surface 106.

The abrasive particle 100 can be formed such that the body 101 includes a polycrystalline material. Notably, the polycrystalline material can include abrasive grains. For example, the abrasive particle 100 can be an agglomerate including a plurality of abrasive particles, grit, and/or grains bonded to each other to form the body 101 of the abrasive particle 100. Suitable abrasive grains can include nitrides, oxides, carbides, borides, oxynitrides, oxyborides, diamond, and a combination thereof. In particular instances, the abrasive grains can include an oxide compound or complex, such as aluminum oxide, zirconium oxide, titanium oxide, yttrium oxide, chromium oxide, strontium oxide, silicon oxide, and a combination thereof. In one particular instance, the abrasive particle 100 is formed such that the abrasive grains forming the body 101 include alumina, and more particularly, may consist essentially of alumina.

The abrasive particles contained within the body 101 can by polycrystalline and have an average particle size that is generally not greater than about 100 microns. In other embodiments, the average particle size can be less, such as not greater than about 80 microns, not greater than about 50 microns, not greater than about 30 microns, not greater than about 20 microns, not greater than about 10 microns, or even not greater than about 1 micron. Still, the average size of the abrasive grains contained within the body 101 can be at least about 0.01 microns, such as at least about 0.05 microns, such as at least about 0.08 microns, at least about 0.1 microns, or even at least about 1 micron. It will be appreciated that the abrasive grains can have an average particle size within a range between any of the minimum and maximum values noted above.

In accordance with certain embodiments, the abrasive particle can be a composite article including at least two different types of abrasive grains within the body 101. It will be appreciated that different types of abrasive grains are abrasive grains having different compositions with regard to each other. For example, the body 101 can be formed such that is includes at least two different types of abrasive grains, wherein the two different types of abrasive grains can be nitrides, oxides, carbides, borides, oxynitrides, oxyborides, diamond, and a combination thereof.

In accordance with an embodiment, the abrasive particle 100 can have an average particle size, as measured by the largest dimension measurable on the body 101, of at least about 100 microns. In fact, the abrasive particle 100 can have an average particle size of at least about 150 microns, such as at least about 200 microns, at least about 300 microns, at least about 400 microns, at least about 500 microns, at least about 600 microns, at least about 700 microns, at least about 800 microns, or even at least about 900 microns. Still, the abrasive particle 100 can have an average particle size that is not greater than about 5 mm, such as not greater than about 3 mm, not greater than about 2 mm, or even not greater than about 1.5 mm. It will be appreciated that the abrasive particle 100 can have an average particle size within a range between any of the minimum and maximum values noted above.

The abrasive particle 100 can be a particularly dense object. For example, the density of the abrasive particle 100 can be at least about 90% of theoretical density. In other instances, the density of the abrasive particle 100 can be greater, such as at least about 92%, at least about 95%, or even at least about 97% theoretical density.

As illustrated, the body 101 can have a length (l), a width (w), and a height (h). In accordance with an embodiment, the body 101 can be formed such that the length≥width≥height. In particular instances, the body 101 can be formed to have a primary aspect ratio, which is a ratio expressed as length:width, having a value of at least 1:1. In other instances, the body 101 can be formed such that the primary aspect ratio (l:w) is at least about 1.5:1, such as at least about 2:1, at least about 4:1, or even at least about 5:1. Still, in other instances, the abrasive particle 100 can be formed such that the body has a primary aspect ratio that is not greater than about 10:1, such as not greater than 9:1, not greater than about 8:1, or even not greater than about 5:1. It will be appreciated that the body 101 can have a primary aspect ratio within a range between any of the ratios noted above. Furthermore, it will be appreciated that reference herein to a height is the maximum height measurable of the abrasive particle. It will be described later that the abrasive particle may have different heights at different positions within the body 101 of the abrasive particle 100.

In addition to the primary aspect ratio, the abrasive particle 100 can be formed such that the body 101 comprises a secondary aspect ratio, which can be defined as a ratio of width:height. In certain instances, the secondary aspect ratio can be within a range between about 5:1 and about 1:3, such as between about 4:1 and about 1:2, or even between about 3:1 and about 1:2.

In accordance with another embodiment, the abrasive particle 100 can be formed such that the body comprises a tertiary aspect ratio, defined by the ratio length:height. The tertiary aspect ratio of the body 101 can be within a range between about 10:1 and about 1.5:1, such as between 8:1 and about 1.5:1, such as between about 6:1 and about 1.5:1, or even between about 4:1 and about 1.5:1.

As illustrated in FIG. 1, the abrasive particle 100 can be formed such that it can have a three-dimensional shape, which can be a polyhedral particle shape. Some suitable polyhedral particle shapes can include tetrahedrons, pentahedrons, hexahedrons, heptahedrons, octahedrons, nonahedron, decahedrons, and a combination thereof.

Figure 2:
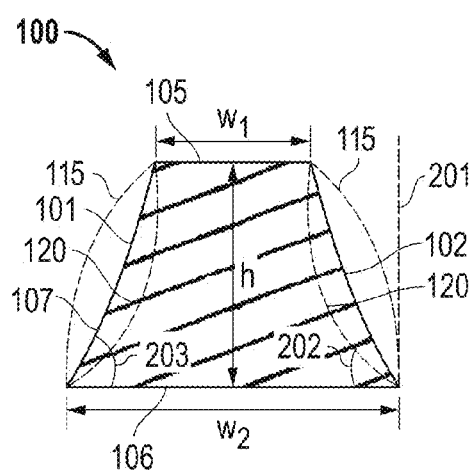
FIG. 2 includes a cross-sectional illustration of the abrasive particle of FIG. 1 in accordance with an embodiment.

FIG. 2 includes a cross-sectional illustration of the abrasive particle of FIG. 1. As illustrated, the abrasive particle can have a generally polygonal two-dimensional contour when viewed in a plane defined by the width and height (i.e., the plane AA in FIG. 1). Notably, the abrasive particle 100 can have a generally trapezoidal two-dimensional shape. Accordingly, the body 101 can have an upper surface 105 defining a first width ($w_1$) and a base 106 defining a second width ($w_2$). As illustrated, the abrasive particle 100 can have a body 101, wherein the width of the bottom surface 106 ($w_2$) is greater than the width ($w_1$) of the upper surface 105. In particular instances, the difference ($\Delta w$) between the width of the bottom surface 106 ($w_2$) and the width ($w_1$) of the upper surface 105 can be at least about 5%, wherein the difference is calculate as $\Delta w=[(w_2-w_1)/w_2]\times 100\%$. In other embodiments, the difference in the width ($\Delta w$) can be greater, such that the difference between the first width ($w_1$) and the second width ($w_2$) can be at least about 1%, such as at least about 2%, at least about 3%, at least about 4%, at least about 5%, at least about 7%, at least about 10%, at least about 12%, or even at least about 15%. Still, in other embodiments, the difference in the width ($\Delta w$) between the bottom surface 106 and upper surface 105 can be not greater than about 80%, such as not greater than about 70%, not greater than about 60%, not greater than about 50%, not greater than about 40%, or even not greater than about 30%. It will be appreciated that the difference between the width of the bottom surface 106 and upper surface 105 can be within a range between any of the minimum and maximum percentages provided above.

Figure 3:
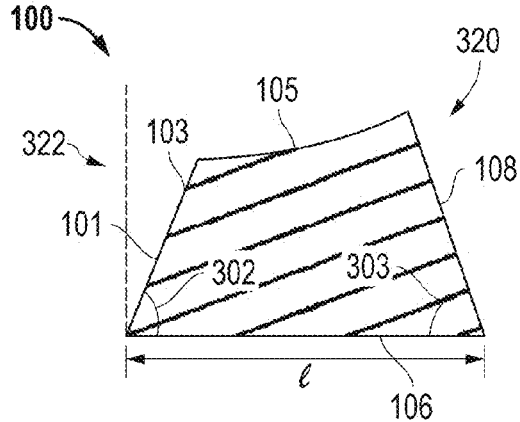
FIG. 3 includes a cross-sectional illustration of the abrasive particle of FIG. 1 in accordance with an embodiment.

Furthermore, it will be appreciated that the abrasive particle 100 can be formed such that it has a generally trapezoidal two-dimensional shape as viewed in a plane defined by the length (l) and the height (h), such as illustrated in FIG. 3. As such, the two-dimensional shape of the abrasive particle 100 can have the same difference in width between the bottom surface 106 and upper surface 105 as viewed in a plane defined by the length and the height.

As further illustrated in FIG. 2, the bottom surface 106 can be formed such that it has a greater surface area as compared to the upper surface 105 of the body 101 of the abrasive particle 100. In accordance with an embodiment, the body 101 can have a bottom surface 106 that comprises at least 30% of the total surface area of the body 101. In other embodiments, the bottom surface 106 can comprise a greater percentage of the total surface area of the body 101, such as at least about 35%, at least about 40%, at least about 45%, at least about 50%, or even at least about 60%. Still, it will be appreciated that the bottom surface 106 can account for not greater than about 90%, such as not greater than about 80%, or even not greater than about 75% of the total surface area of the body 101. The bottom surface 106 can account for an amount of the total surface area of the body 101 within a range between any of the minimum and maximum percentages noted above.

Formation of an abrasive particle wherein the bottom surface 106 has a greater surface area as compared to the other surfaces (e.g., the upper surface 105) can facilitate the formation of an abrasive particle capable of preferential orientation in an upright position. Preferential orientation into an upright position is reference to a position of the abrasive particle as illustrated in FIG. 1. That is, the abrasive particle 100 can be oriented such that the upper surface 105 is facing upward, and positioned in a cutting position to engage a workpiece for abrading applications.

The abrasive particle 100 can be formed such that it has an upright orientation probability of at least 50%. That is, when the abrasive particle 100 is dropped from a known distance, based upon the shape of the abrasive particle 100, the particle preferentially aligns and is oriented in an upright position as illustrated in FIG. 1. In accordance with an embodiment, the upright orientation probability of the abrasive particle 100 can be greater, such as at least about 50%, such as at least about 55%, at least about 60%, at least about 70%, or even at least about 80%. In particular instances, the upright orientation probability of the abrasive particle can be not greater than about 99%, such as not greater than about 97%, or even at least not greater than about 95%. It will be appreciated that the upright orientation probability for the abrasive particle 100 can be within a range between any of the minimum and maximum percentages noted above. Furthermore, formation of an abrasive particle having such upright orientation probabilities facilitates formation of abrasive articles, such as coated abrasives, wherein the abrasive particles are preferentially oriented for most efficient abrading applications.

As further illustrated in FIG. 2, the abrasive particle 100 can be formed such that the side surfaces 107 and 102 extend between the upper surface 105 and the bottom surface 106. As illustrated, the side surfaces 107 and 102 can be tapered relative to a vertical axis defined by the height, thus facilitating the trapezoidal two-dimensional shape of the abrasive particle 100.

In other embodiments, the side surfaces 107 and 102 can have curvilinear shapes. For example, the surfaces 107 and 102 can have convex shapes such as illustrated by the dotted line 115. In other embodiments, the side surfaces 107 and 102 can be formed to have a concave shape as illustrated by the dotted lines 120.

As further illustrated in FIG. 2, the abrasive particle 100 can be formed to have a particular rake angle 202, which can be defined as the angle between the side surface 102 and the bottom surface 106 relative to a vertical axis 201. In accordance with an embodiment, the abrasive particle 100 can have a body 101 wherein the rake angle 202 can be within a range between 1° and about 80°. In other embodiments, the rake angle can be within a range between about 5° and 55°, such as between about 10° and about 50°, between about 15° and 50°, or even between about 20° and 50°. Formation of an abrasive particle 100 having such a rake angle can improve the abrading capabilities of the abrasive particle 100. Notably, the rake angle can be within a range between any two rake angles noted above.

The body 101 of the abrasive particle 100 can further include a rake angle 203 as defined between the side surface 107 and the bottom surface 106 relative to the vertical axis 201. In accordance with an embodiment, the rake angle 203 can be substantially the same as the rake angle 202. Still, in other embodiments, the rake angle 203 can be engineered to be different than the rake angle 202. In fact, the rake angle 203 may be engineered to be significantly different than the take angle 202 to facilitate certain particular wear characteristics and abrasive capabilities of the abrasive particle 100.

FIG. 3 includes a cross-sectional view of the abrasive particle of FIG. 1 as viewed in a plane defined by the length and the height (i.e, the plane BB as illustrated in FIG. 1). The abrasive particle 100 as viewed in a plane defined by the length (l) and the height (h) can have a generally polygonal two-dimensional shape. In particular, the abrasive particle 100 can have a two-dimensional shape as viewed in the plane defined by the length and the height that is has a generally trapezoidal polygonal shape.

Still, as illustrated, the upper surface 105 can have a curvilinear contour. That is, the upper surface 105 of the abrasive particle 100 can be tilted such that the abrasive particle has a greater height at different locations within the abrasive particle. For example, height defined by the distance of the upper surface 105 from the bottom surface 106 at the end 320 of the abrasive particle 100 is different as compared to the height of the abrasive particle at an opposite end 322 of the abrasive particle 100. In fact, in particular instances, the upper surface 105 of the abrasive particle can have a concave shape. Further details on such features are discussed in greater detail herein.

As further illustrated, the abrasive particle 100 can have a rake angle 302 as defined between the side surface 101 and the bottom surface 106 of the abrasive particle 100. The rake angle 302 can be substantially the same as the rake angle 202 described herein. In other instances, the rake angle 302 can be significantly different than any other rake angle described in accordance with the embodiments herein. Still, the rake angle 302 can have a value within a range between about 1° and about 80°, such as between about 1° and about 70°, between about 1° and about 60°, between about 5° and about 60°, between about 15° and 55°, between about 10° and about 50°, between about 15° and 50°, or even between about 20° and 50°.

Additionally, the abrasive particle 100 can be formed to have a rake angle 303, defined as an angle between the side surface 108 and the bottom surface 106 of the abrasive particle 100. The rake angle 303 can be the same as the rake angle 302. However, in particular embodiments, the rake angle 303 may be formed to be a significantly different angle as compared to the rake angle 302. Still, the rake angle 303 can have a value within a range between about 1° and about 80°, such as between about 1° and about 70°, between about 1° and about 60°, between about 5° and about 60°, such as between about 5° and 55°, between about 10° and about 50°, between about 15° and 50°, or even between about 20° and 50°. Notably, the rake angle can be within a range between any two rake angles noted above.

While not illustrated, it will be appreciated that the side surfaces 101 and 108 can include the same features as side surfaces 107 and 102. That is, for example, the side surfaces 101 and 108 can have curvilinear contours. Moreover, the curvilinear contours may be defined as concave, convex, or a combination thereof.

Figure 4:
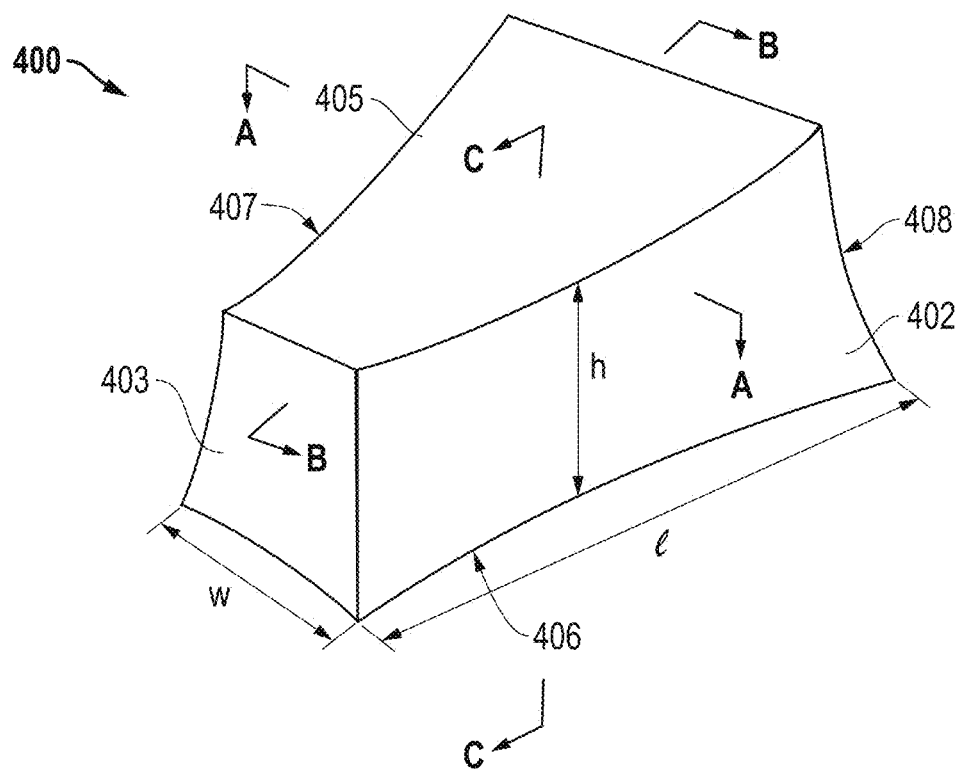
FIG. 4 includes a perspective view illustration of an abrasive particle in accordance with an embodiment.

FIG. 4 includes a perspective view illustration of an abrasive particle in accordance with an embodiment. As illustrated, the abrasive particle 400 includes an upper surface 405, a bottom surface 406 opposite the upper surface 405, and side surfaces 403, 402, 407, and 408, extending between the upper surface 405 and bottom surface 406.

Figure 5:
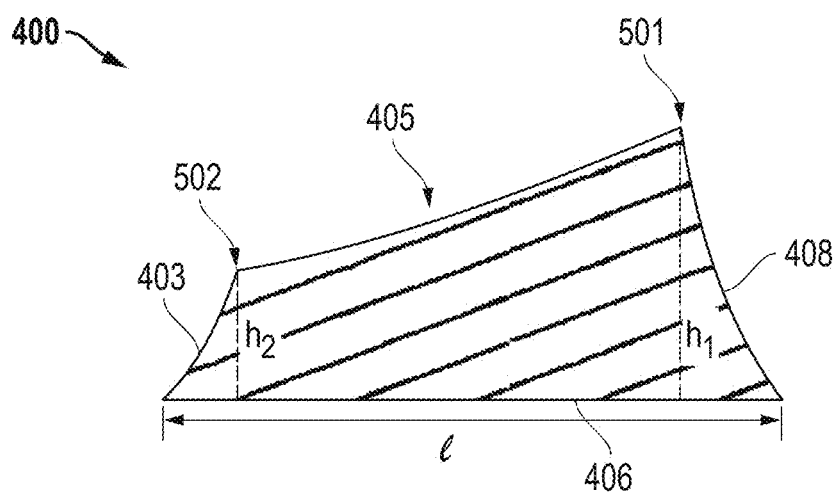
FIG. 5 includes a cross-sectional illustration of an abrasive particle of FIG. 4 in accordance with an embodiment.

FIG. 5 includes a cross-sectional illustration of a portion of the abrasive particle of FIG. 4. Notably, the abrasive particle illustrated in FIG. 5 is a cross-sectional view of the abrasive particle 400 as viewed in a plane defined by the length (l) and the height (h) of the abrasive particle 400 (i.e., the plane CC of FIG. 4). According to one embodiment, the abrasive particle 400 can have a first height ($h_1$) at a first end 501 of the abrasive particle 400 and a second height ($h_2$) at a second end 502 of the abrasive particle 400. In accordance with an embodiment, the first end 501 and second end 502 can be spaced apart from each other by substantially the full length (l) of the abrasive particle 400. In accordance with an embodiment, the first height ($h_1$) and the second height ($h_2$) can be significantly different from each other. In more particular instances, the abrasive particle 400 can be formed such that the first height ($h_1$) and the second height ($h_2$) have a difference ($\Delta h$) of at least about 5%, wherein the height difference is calculate as $\Delta h=[(h_1-h_2)/h_1]\times 100\%$, wherein $h_1$ is the first height and the $h_2$ is the second height, and the second height is less than the first height. Notably, the height difference ($\Delta h$) can be at least about 8%, such as at least about 10%, at least about 15%, at least about 20%, at least about 40%, or even at least about 50%. Still, in other embodiments, the abrasive particle 400 can be formed such that the height difference ($\Delta h$) is not greater than about 98%, such as not greater than about 95%, or even not greater than about 90%. The height difference can be within a range between any of the percentages noted above.

According to a particular embodiment, the abrasive particle can have a height ($h_1$) of at least about 100 microns. In fact, the abrasive particle 400 can have a height ($h_1$) of at least about 150 microns, such as at least about 175 micron, at least about 200 microns, at least about 250 microns, at least about 300 microns, at least about 400 microns, at least about 500 microns, at least about 600 microns, or even at least about 700 microns. Still, the abrasive particle 400 can have a height ($h_1$) that is not greater than about 5 mm, such as not greater than about 3 mm, not greater than about 2 mm, or even not greater than about 1.5 mm. It will be appreciated that the abrasive particle 400 can have a height ($h_1$) within a range between any of the minimum and maximum values noted above.

As further illustrated, the upper surface 405 can be tilted, such that it is angled relative to the bottom surface 406. In fact, the upper surface 405 can define a non-parallel plane relative to the bottom surface 406.

As further illustrated in FIG. 5, the side surfaces 403 and 408 extending between the upper surface 405 and bottom surface 406 can have generally curvilinear contours. That is, side surfaces 403 and 408 have generally concave contours.

Figure 6:
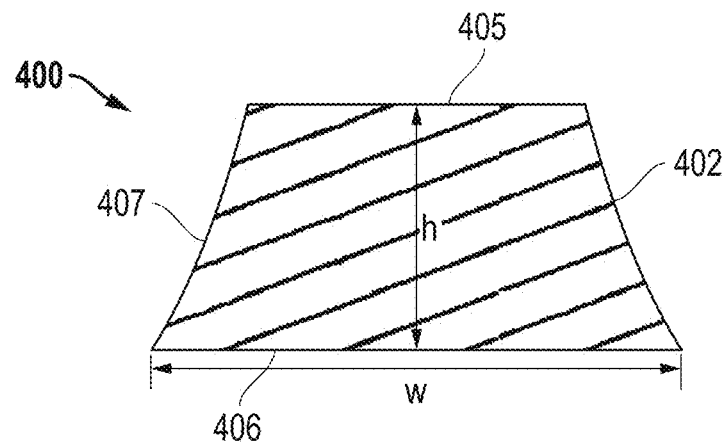
FIG. 6 includes a cross-sectional illustration of the abrasive particle of FIG. 4 in accordance with an embodiment.

FIG. 6 includes a cross-sectional illustration of the abrasive particle of FIG. 4. In particular, FIG. 6 includes a cross-sectional illustration as viewed in a plane defined by the width and height of the abrasive particle 400 (i.e., the plane AA of FIG. 4). Notably, the side surfaces 407 and 402 extending between the upper surface 405 and bottom surface 406 can have curvilinear contours. More particularly, the side surfaces 407 and 402 can have concave contours.

Figure 7:
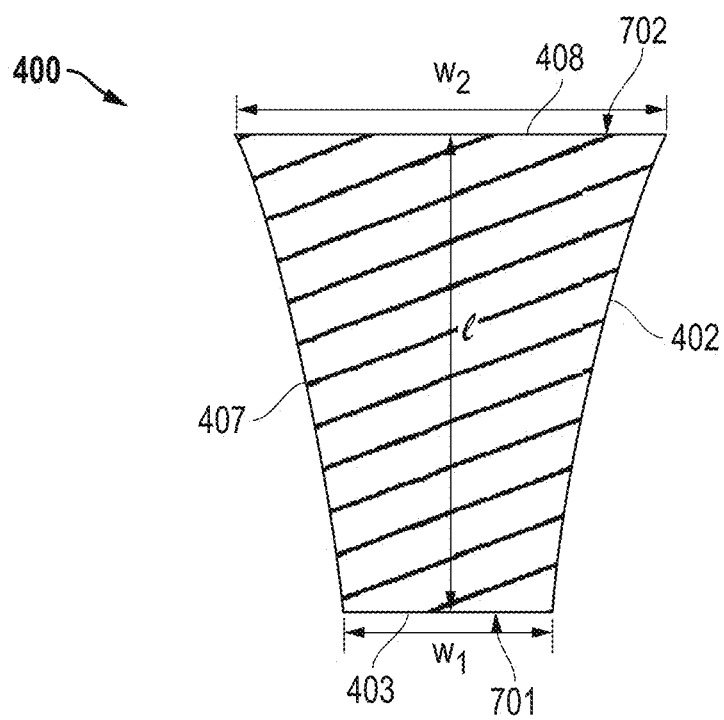
FIG. 7 includes a cross-sectional illustration of the abrasive particle of FIG. 4 in accordance with an embodiment.

FIG. 7 includes a cross-sectional illustration of a portion of the abrasive particle of FIG. 4. Notably, the cross-sectional illustration of FIG. 7 is viewed in a plane defined by the length and width of the abrasive particle 400 (i.e., the plane BB in FIG. 4). In accordance with an embodiment, the abrasive particle 400 can be formed such that it has a first width ($w_1$) at a first end 701 of the abrasive particle defined by the side surface 403. Additionally, the abrasive particle 400 can be formed such that it has a second width ($w_2$) at a second end 702 at the side surface 408 of the abrasive particle 400. Notably, the first end 701 and second end 702 can be spaced apart by substantially the full length (l) of the abrasive particle 400.

The abrasive particle 400 can be formed such that the body has a generally trapezoidal two-dimensional shape as viewed in the plane defined by the length and the width. As such, the abrasive particle 400 can have a first width ($w_1$) that is significantly less than the second width ($w_2$), wherein the first and second widths are space apart by the full length of the abrasive particle 400.

In accordance with an embodiment, the abrasive particle 400 can be formed such that the first width ($w_1$) is different than the second width ($w_2$) by a difference ($\Delta w$) of at least about 2%, wherein the difference ($\Delta w$) can be calculated from the equation $\Delta w=[(w_2-w_1)/w_2]\times 100\%$, wherein $w_2$ is greater than $w_1$. In other embodiments, the difference between ($w_1$) and ($w_2$) can be greater, such as least about 5%, at least about 8%, at least about 10%, at least about 20%, at least about 30%, or even at least about 40%. Still, the difference in widths ($\Delta w$) can be not greater than about 98%, not greater than about 95%, or even not greater than about 90%. The difference in the widths can be within a range between any of the percentages noted above.

According to a particular embodiment, the abrasive particle can have a width ($w_2$) of at least about 100 microns. In fact, the abrasive particle 400 can have a width ($w_2$) of at least about 150 microns, such as at least about 175 micron, at least about 200 microns, at least about 250 microns, at least about 300 microns, at least about 400 microns, at least about 500 microns, at least about 600 microns, or even at least about 700 microns. Still, the abrasive particle 400 can have a width ($w_2$)

that is not greater than about 5 mm, such as not greater than about 3 mm, not greater than about 2 mm, or even not greater than about 1 mm. It will be appreciated that the abrasive particle 400 can have a width ($w_2$) within a range between any of the minimum and maximum values noted above.

Furthermore, it will be appreciated that the greatest length of any particle formed according to the embodiments herein can have the same dimensions as noted above for the width ($w_2$).

FIG. 8 includes a perspective view illustration of an abrasive particle in accordance with an embodiment. As illustrated, the abrasive particle 800 can include an upper surface 805, a bottom surface 806 opposite the upper surface 805, and side surfaces 803, 802, 804, and 807 extending between and connecting the upper surface 805 and bottom surface 806. In accordance with an embodiment, the abrasive particle 800 can have an upper surface 805 including a texture 809. The texture 809 can include a pattern defining an array of features. Some suitable examples of features can include protrusions, grooves, and a combination thereof. The protrusions and grooves defining the texture 809 can be arranged in a regular array. That is, the protrusions and grooves can define a regular and repeating arrangement of features with respect to each other that can have short range order and/or long-range order across the upper surface 805. For example, the upper surface 805 can include grooves 810 and protrusions 811, which extend in between each other and across the entire length of the upper surface 805 of the abrasive particle 800. Still, it will be appreciated that the grooves 810 and protrusions 811 can extend for a portion of the total length of the upper surface 805.

In other instances, the texture can be defined by an irregular arrangement of features on the upper surface 805. For example, the upper surface 805 can include randomly oriented and randomly positioned features, such as grooves 810 and protrusions 811, such that no pattern or order exists between the features.

In accordance with an embodiment, the grooves 810 and protrusions 811 can be positioned relative to each other to create scalloped edges 815 and 816. The scalloped edges 815 and 816 may facilitate improved cutting capabilities and friability of the abrasive particle 800. Other series and arrangement of features can be provided on the upper surface 805 to create edges between the upper surface 805 and side surfaces 803, 802, 804, and 807 having certain features. That is, texturing of the upper surface 805 can facilitate the formation of edges 815 and 816 having particular features that can improve the abrasive capabilities of the abrasive grain 800.

The foregoing has described an abrasive particle 800 having a textured upper surface 805. However, it will be appreciated other surfaces of the abrasive particle can be textured, including for example, a side surface 802 that is adjacent to and extends at an angle to the upper surface 805. Moreover, one or more combination of surfaces of the abrasive particle 800 can be textured.

The embodiments herein have been directed to abrasive particles having particular shapes. While the foregoing has demonstrated abrasive particles having generally four sides as viewed in cross-section, other polyhedral shapes can be utilized, and such polyhedral shapes can have particular polygonal two-dimensional shapes. For example, the abrasive particles of embodiments herein can include abrasive particles having two-dimensional shapes of triangles, quadrilaterals, pentagons, hexagons, heptagons, octagons, nonagons, and decagons. For example, FIG. 9 includes a cross-sectional illustration of an abrasive particle 900 having a generally quadrilateral, and more particularly, a rectangular two-dimensional shape, as viewed in a plane defined by the width and the height. Alternatively, FIG. 10 includes a perspective view illustration of an abrasive particle that can have a generally octagonal two-dimensional shape as viewed in a plane defined by the length and width.

Referring now to additional shaped abrasive particles, a shaped abrasive particle of an embodiment herein can have a body defined by a length (l), which can be the longest dimension of any side of the shaped abrasive particle, a width (w) defined as a longest dimension of the shaped abrasive particle through a midpoint of the shaped abrasive particle, and a thickness (t) defined as the shortest dimension of the shaped abrasive particle extending in a direction perpendicular to the length and width. In specific instances, the length can be greater than or equal to the width. Moreover, the width can be greater than or equal to the thickness.

Additionally, the body of the shaped abrasive particles can have particular two-dimensional shapes. For example, the body can have a two-dimensional shape as viewed in a plane define by the length and width having a polygonal shape, ellipsoidal shape, a numeral, a Greek alphabet character, Latin alphabet character, Russian alphabet character, complex shapes utilizing a combination of polygonal shapes and a combination thereof. Particular polygonal shapes include triangular, rectangular, quadrilateral, pentagon, hexagon, heptagon, octagon, nonagon, decagon, any combination thereof.

Figure 12A:
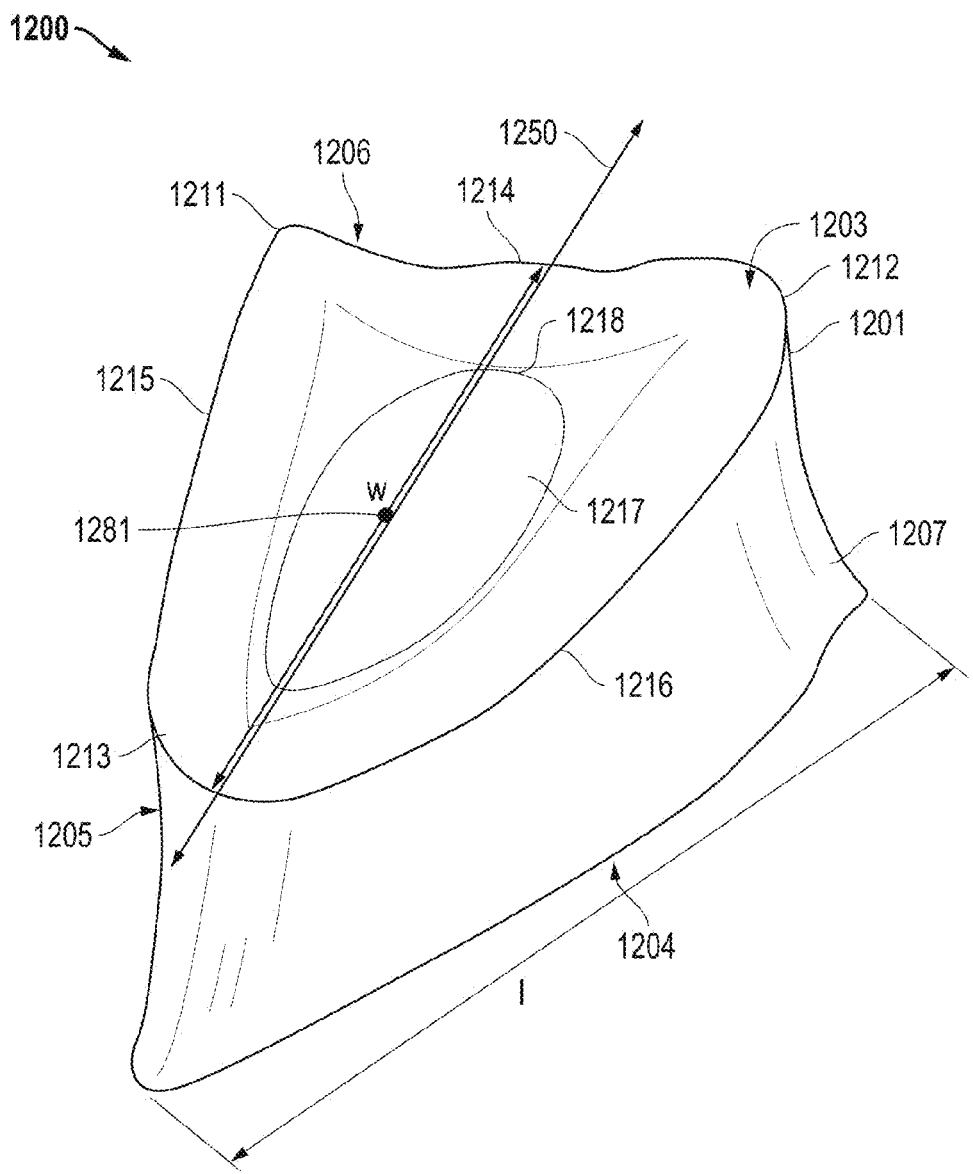
FIG. 12A includes a perspective view illustration of an abrasive particle in accordance with an embodiment.

FIG. 12A includes a perspective view illustration of an abrasive particle in accordance with an embodiment. Additionally, FIG. 12B includes a cross-sectional illustration of the abrasive particle of FIG. 12A. The body 1201 includes an upper surface 1203 a bottom major surface 1204 opposite the upper surface 1203. The upper surface 1203 and the bottom surface 1204 can be separated from each other by side surfaces 1205, 1206, and 1207. As illustrated, the body 1201 of the shaped abrasive particle 1200 can have a generally triangular shape as viewed in a plane of the upper surface 1203 defined by the length (l) and width (w) of the body 1201. In particular, the body 1201 can have a length (l), a width (w) extending through a midpoint 1281 of the body 1201.

In accordance with an embodiment, the body 1201 of the shaped abrasive particle can have a first height (h1) at a first end of the body defined by a corner 1213. Notably, the corner 1213 may represent the point of greatest height on the body 1201. The corner can be defined as a point or region on the body 1201 defined by the joining of the upper surface 1203, and two side surfaces 1205 and 1207. The body 1201 may further include other corners, spaced apart from each other, including for example corner 1211 and corner 1212. As further illustrated, the body 1201 can include edges 1214, 1215, and 1216 that can separated from each other by the corners 1211, 1212, and 1213. The edge 1214 can be defined by an intersection of the upper surface 1203 with the side surface 1206. The edge 1215 can be defined by an intersection of the upper surface 1203 and side surface 1205 between corners 1211 and 1213. The edge 1216 can be defined by an intersection of the upper surface 1203 and side surface 1207 between corners 1212 and 1213.

Figure 12B:
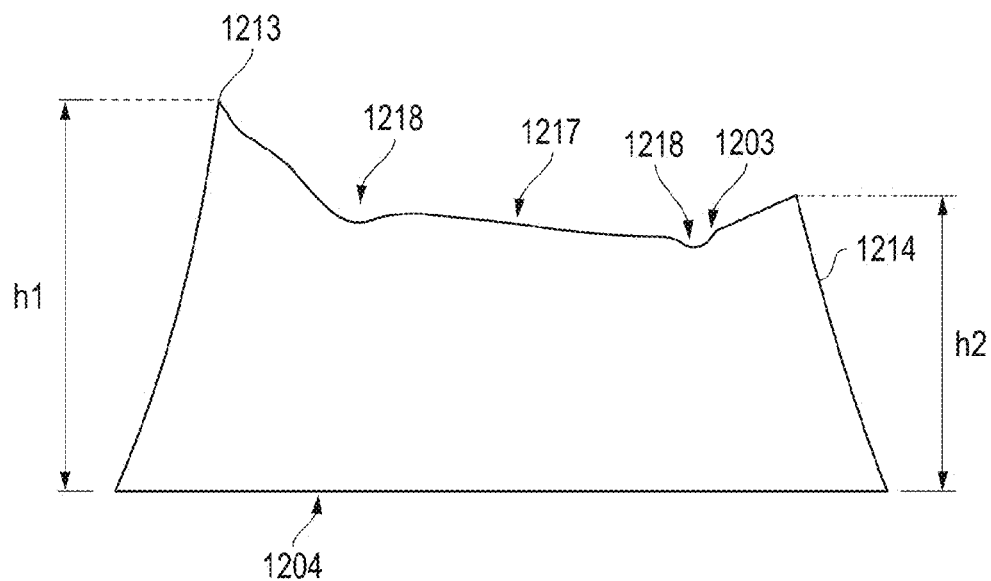
FIG. 12 B includes a cross-sectional illustration of a portion of the abrasive particle of FIG. 12A.

As further illustrated, the body 1201 can include a second height (h2) at a second end of the body, which defined by the edge 1214, and further which is opposite the first end defined by the corner 1213. The axis 1250 can extend between the two ends of the body 1201. FIG. 12B is a cross-sectional illustration of the body 1201 along the axis 1250, which can extend through a midpoint 1281 of the body along the dimension of width (w) between the ends of the body 1201.

In accordance with an embodiment, the shaped abrasive particles of the embodiments herein, including for example, the particle of FIGS. 12A and 12B can have an average difference in height, which is a measure of the difference between h1 and h2. More particularly, the average difference in height can be calculated based upon a plurality of shaped abrasive particles from a sample. The sample can include a representative number of shaped abrasive particles, which may be randomly selected from a batch, such as at least 8 particles, or even at least 10 particles. A batch can be a group of shaped abrasive particles that are produced in a single forming process, and more particularly, in the same, single forming process. The average difference can be measured via using a STIL (Sciences et Techniques Industrielles de la Lumiere—France) Micro Measure 3D Surface Profilometer (white light (LED) chromatic aberration technique).

In particular instances, the average difference in height [h1-h2], wherein h1 is greater, can be at least about 50 microns. In still other instances, the average difference in height can be at least about 60 microns, such as at least about 65 microns, at least about 70 microns, at least about 75 microns, at least about 80 microns, at least about 90 microns, or even at least about 100 microns. In one non-limiting embodiment, the average difference in height can be not greater than about 300 microns, such as not greater than about 250 microns, not greater than about 220 microns, or even not greater than about 180 microns. It will be appreciated that the average difference in height can be within a range between any of the minimum and maximum values noted above.

Moreover, the shaped abrasive particles herein, including for example the particle of FIGS. 12A and 12B, can have a profile ratio of average difference in height [h1−h2] to profile length ($l_p$) of the shaped abrasive particle, defined as [(h1−h2)/($l_p$)] of at least about 0.04. It will be appreciated that the profile length of the body can be a length of the scan across the body used to generate the data of h1 and h2 between opposite ends of the body. Moreover, the profile length may be an average profile length calculated from a sample of multiple particles that are measured. In certain instances, the profile length ($l_p$) can be the same as the width as described in embodiments herein. According to a particular embodiment, the profile ratio can be at least about 0.05, at least about 0.06, at least about 0.07, at least about 0.08, or even at least about 0.09. Still, in one non-limiting embodiment, the profile ratio can be not greater than about 0.3, such as not greater than about 0.2, not greater than about 0.18, not greater than about 0.16, or even not greater than about 0.14. It will be appreciated that the profile ratio can be within a range between any of the minimum and maximum values noted above.

Moreover, the shaped abrasive particles of the embodiments herein, including for example, the body 1201 of the particle of FIGS. 12A and 12B can have a bottom surface 1204 defining a bottom area ($A_b$). In particular instances the bottom surface 1204 can be the largest surface of the body 1201. The bottom surface can have a surface area defined as the bottom area ($A_b$) that is greater than the surface area of the upper surface 1203. Additionally, the body 1201 can have a cross-sectional midpoint area ($A_m$) defining an area of a plane perpendicular to the bottom area and extending through a midpoint 1281 of the particle. In certain instances, the body 1201 can have an area ratio of bottom area to midpoint area ($A_b/A_m$) of not greater than about 6. In more particular instances, the area ratio can be not greater than about 5.5, such as not greater than about 5, not greater than about 4.5, not greater than about 4, not greater than about 3.5, or even not greater than about 3. Still, in one non-limiting embodiment, the area ratio may be at least about 1.1, such as at least about 1.3, or even at least about 1.8. It will be appreciated that the area ratio can be within a range between any of the minimum and maximum values noted above.

In accordance with one embodiment, the shaped abrasive particles of the embodiments herein, including for example, the particle of FIGS. 12A and 12B can have a normalized height difference of at least about 40. The normalized height difference can be defined by the equation [(h1−h2)/(h1/h2)], wherein h1 is greater than h2. In other embodiments, the normalized height difference can be at least about 43, at least about 46, at least about 50, at least about 53, at least about 56, at least about 60, at least about 63, or even at least about 66. Still, in one particular embodiment, the normalized height difference can be not greater than about 200, such as not greater than about 180, not greater than about 140, or even not greater than about 110.

In another embodiment, the shaped abrasive particles herein, including for example, the particle of FIGS. 12A and 12B can have a height variation. Without wishing to be tied to a particular theory, it is thought that a certain height variation between shaped abrasive particles, can improve variety of cutting surfaces, and may improve grinding performance of an abrasive article incorporating the shaped abrasive particles herein. The height variation can be calculated as the standard deviation of height difference for a sample of shaped abrasive particles. In one particular embodiment, the height variation of a sample can be at least about 20. For other embodiments, the height variation can be greater, such as at least about 22, at least about 24, at least about 26, at least about 28, at least about 30, at least about 32, or even at least about 34. Still, in one non-limiting embodiment, the height variation may be not greater than about 180, such as not greater than about 150, or even not greater than about 120. It will be appreciated that the height variation can be within a range between any of the minimum and maximum values noted above.

According to another embodiment, the shaped abrasive particles herein, including for example the particles of FIGS. 12A and 12B can have an ellipsoidal region 1217 in the upper surface 1203 of the body 1201. The ellipsoidal region 1217 can be defined by a trench region 1218 that can extend around the upper surface 1203 and define the ellipsoidal region 1217. The ellipsoidal region 1217 can encompass the midpoint 1281. Moreover, it is thought that the ellipsoidal region 1217 defined in the upper surface can be an artifact of the forming process, and may be formed as a result of the stresses imposed on the mixture during formation of the shaped abrasive particles according to the methods described herein.

Moreover, the rake angle described in accordance with other embodiments herein can be applicable to the body 1201. Likewise, all other features described herein, such as the contours of side surfaces, upper surfaces, and bottom surfaces, the upright orientation probability, primary aspect ratio, secondary aspect ratio, tertiary aspect ratio, and composition, can be applicable to the exemplary shaped abrasive particle illustrated in FIGS. 12A and 12B.

While the foregoing features of height difference, height variation, and normalized height difference have been described in relation to the abrasive particle of FIGS. 12A and 12B, it will be appreciated that such features can apply to any other shaped abrasive particles described herein, including for example, abrasive particles having a substantially trapezoidal two-dimensional shape.

The shaped abrasive particles of the embodiments herein may include a dopant material, which can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

In certain instances, the shaped abrasive particles can be formed to have a specific content of dopant material. For example, the body of a shaped abrasive particle may include not greater than about 12 wt % for the total weight of the body. In other instances, the amount of dopant material can be less, such as not greater than about 11 wt %, not greater than about 10 wt %, not greater than about 9 wt %, not greater than about 8 wt %, not greater than about 7 wt %, not greater than about 6 wt %, or even not greater than about 5 wt % for the total weight of the body. In at least one non-limiting embodiment, the amount of dopant material can be at least about 0.5 wt %, such at least about 1 wt %, at least about 1.3 wt %, at least about 1.8 wt %, at least about 2 wt %, at least about 2.3 wt %, at least about 2.8 wt %, or even at least about 3 wt % for the total weight of the body. It will be appreciated that the amount of dopant material within the body of the shaped abrasive particle can be within a range between any of the minimum or maximum percentages noted above.

Figure 13:
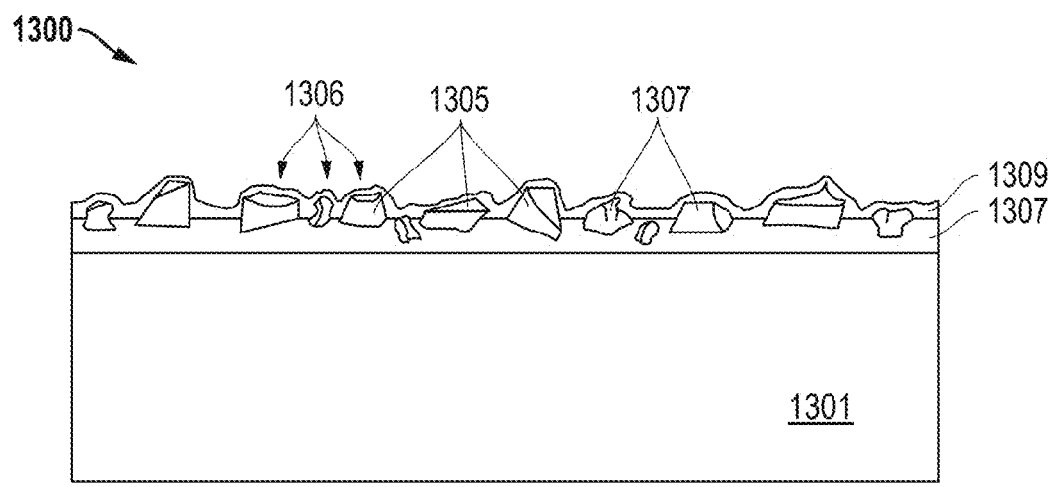
FIG. 13 includes a cross-sectional illustration of a coated abrasive article incorporating the abrasive particulate material in accordance with an embodiment.
Figure 14A:
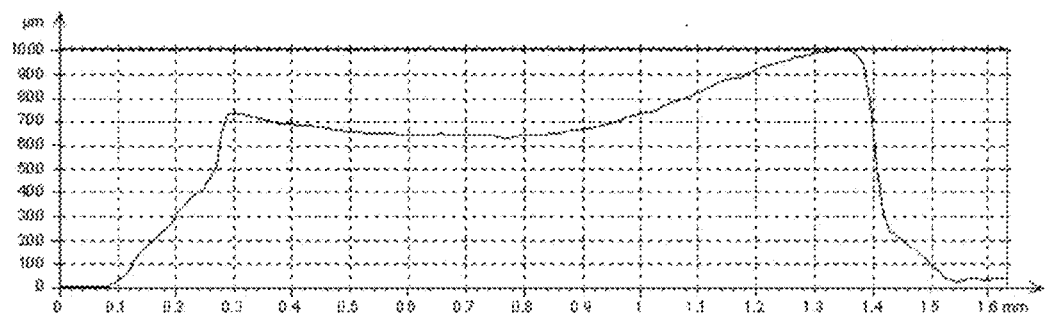
FIGS. 14A-14J provide profilometer scans of each of the shaped abrasive particles of shaped abrasive particles in accordance with an embodiment.
Figure 14B:
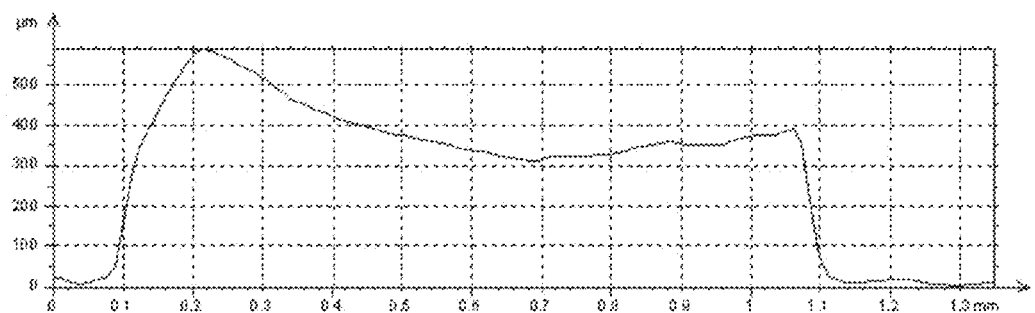
Figure 14C:
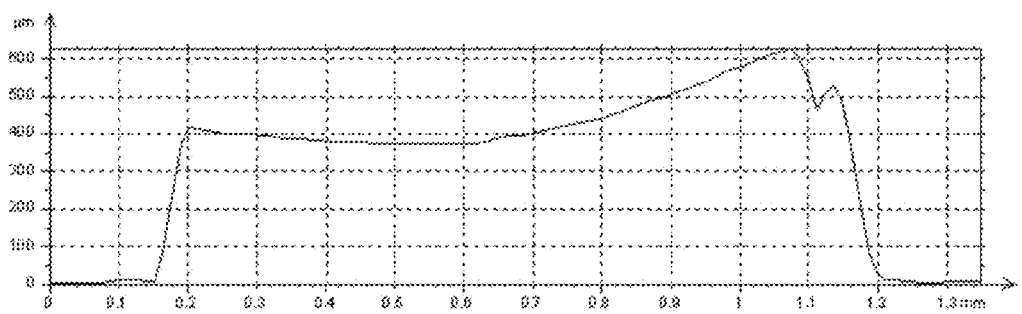
Figure 14D:
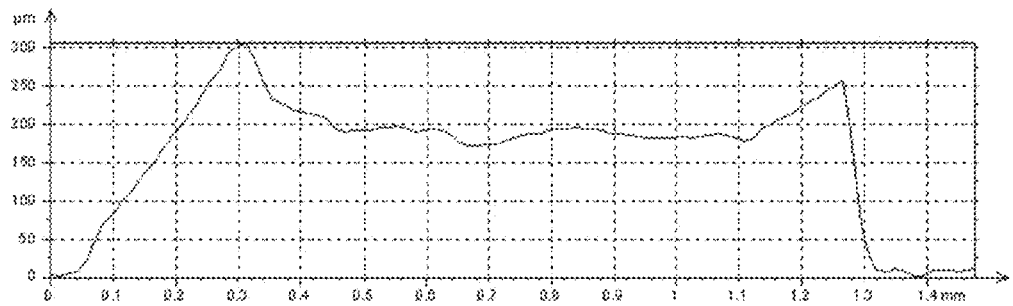
Figure 14E:
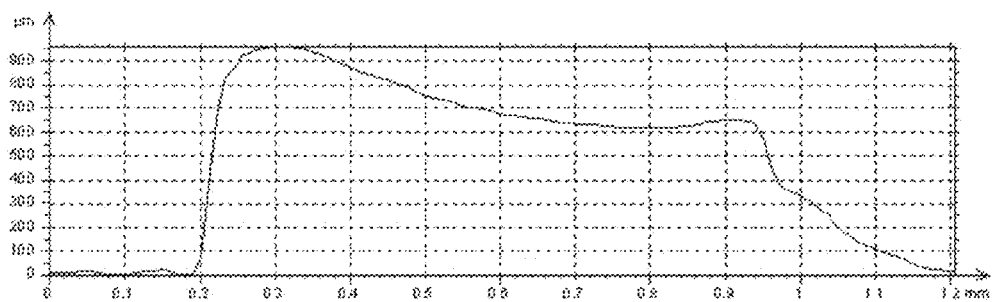
Figure 14F:
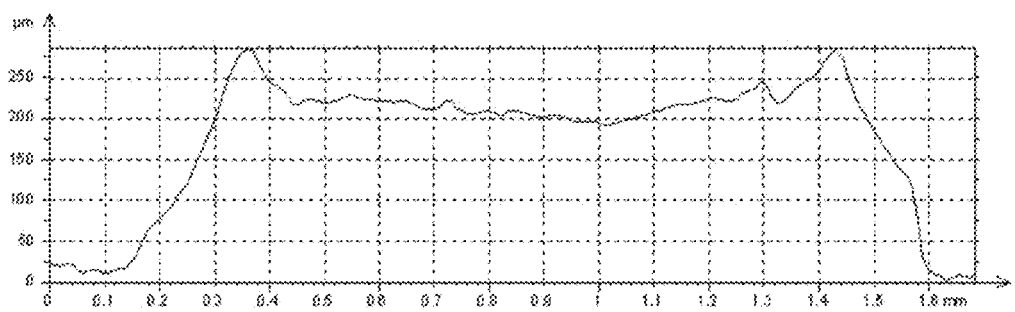
Figure 14G:
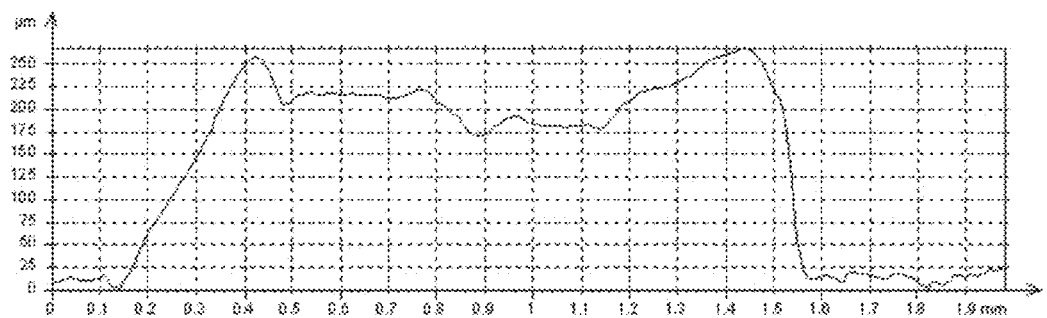
Figure 14H:
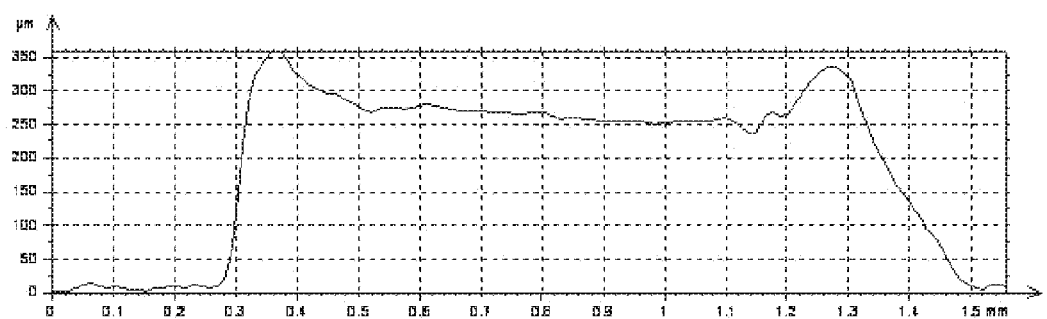
Figure 14I:
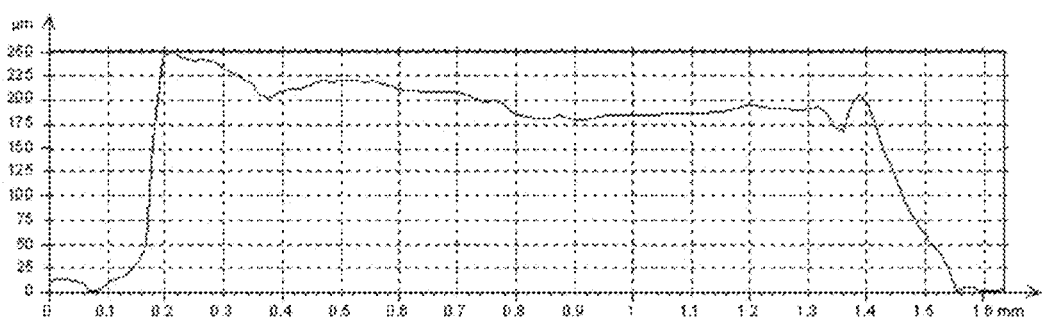
Figure 14J:
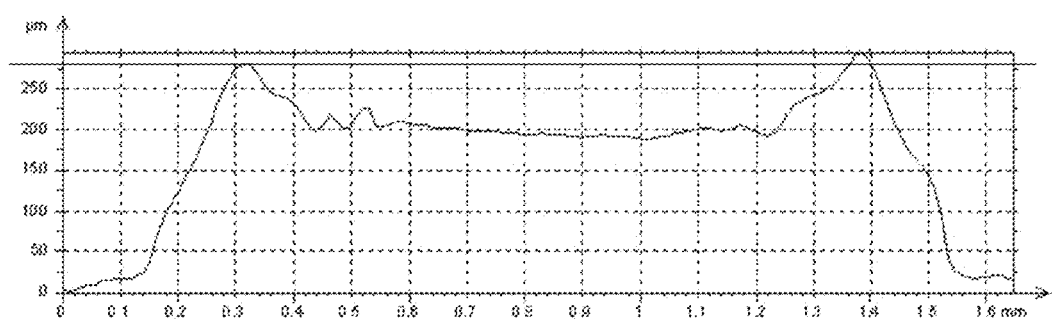
Figure 15A:
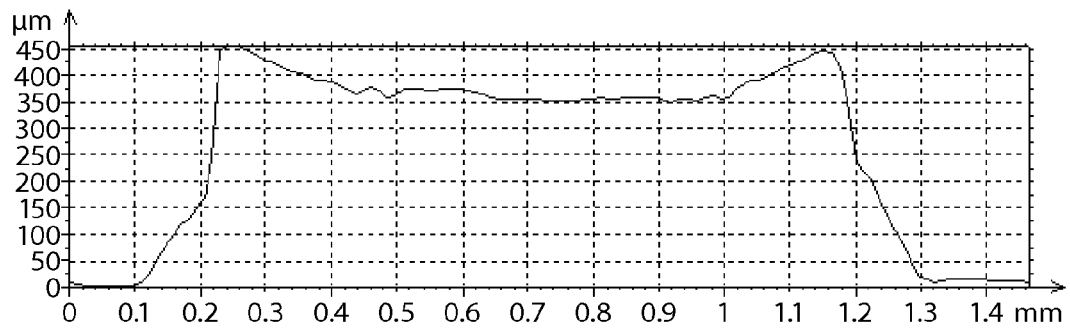
FIGS. 15A-15J provide profilometer scans of each of the shaped abrasive particles of shaped abrasive particles in accordance with an embodiment.
Figure 15B:
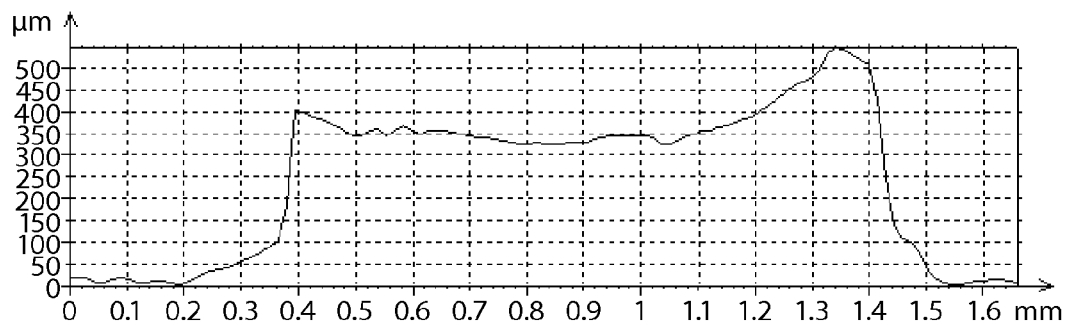
Figure 15C:
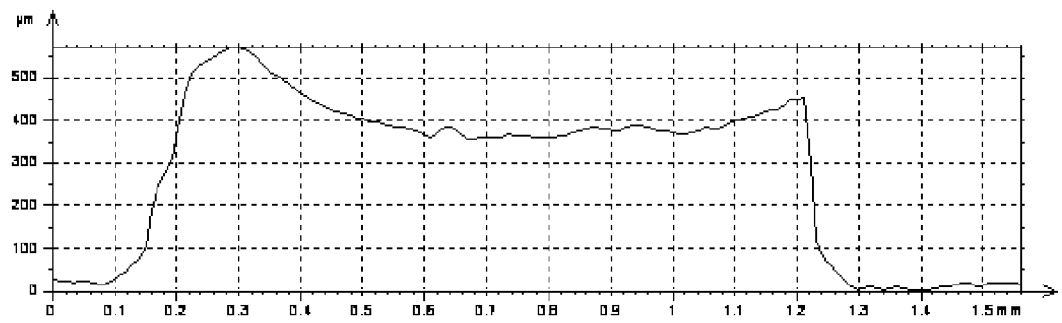
Figure 15D:
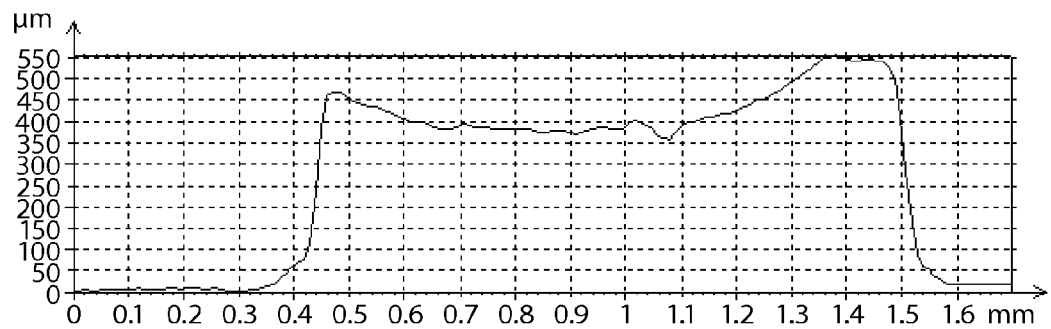
Figure 15E:
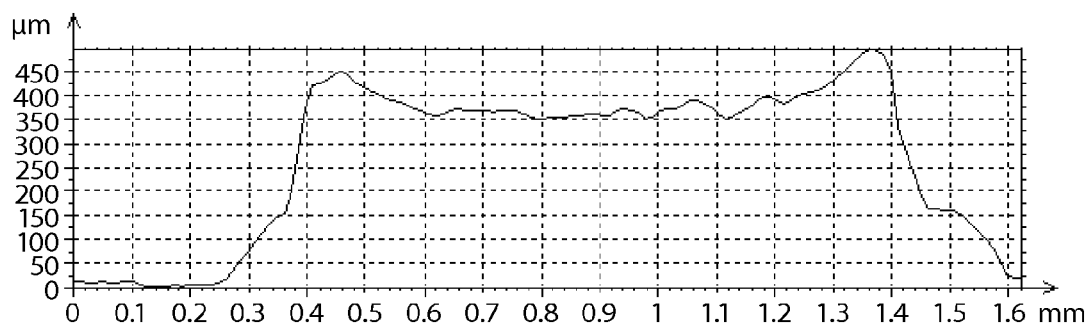
Figure 15F:
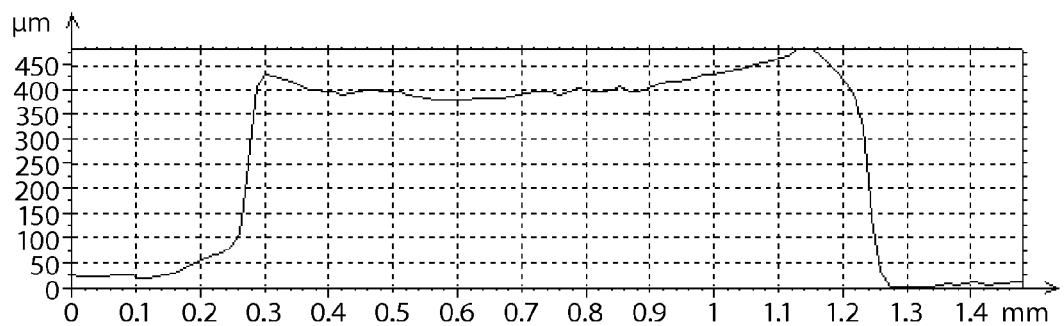
Figure 15G:
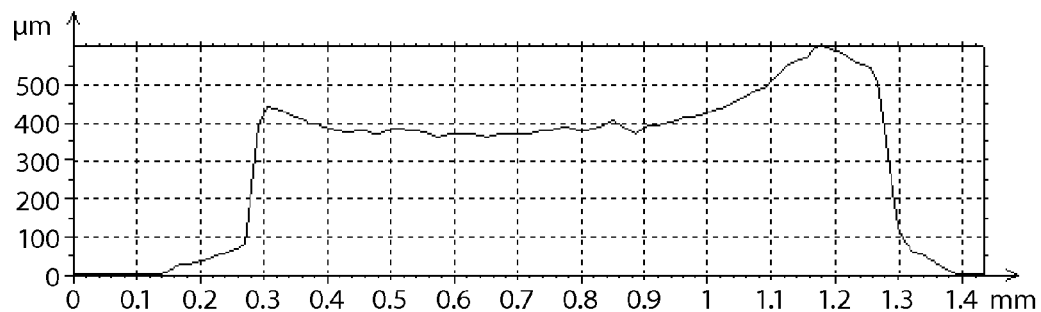
Figure 15H:
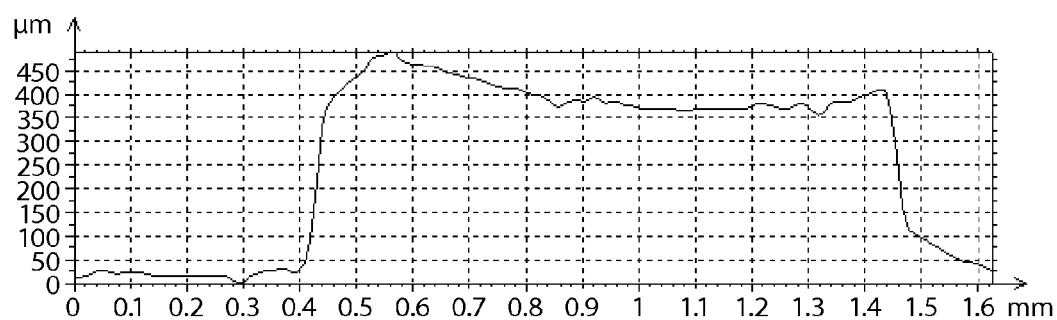
Figure 15I:
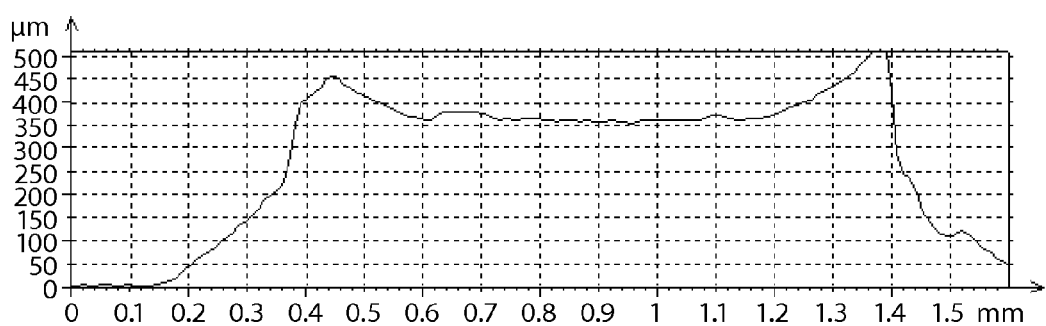
Figure 15J:
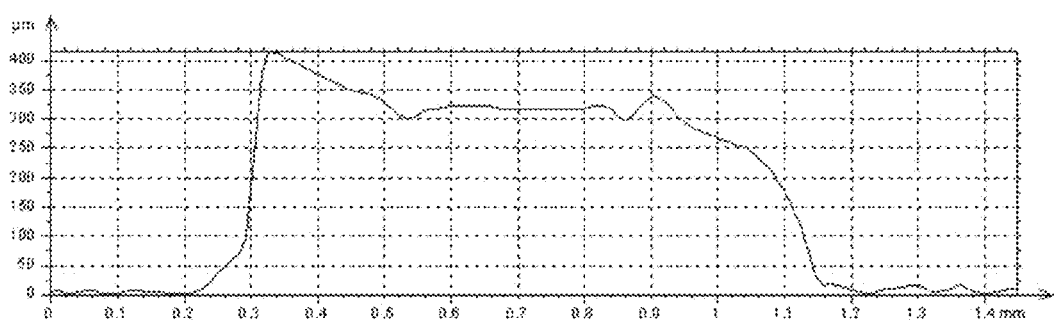
Figure 16A:
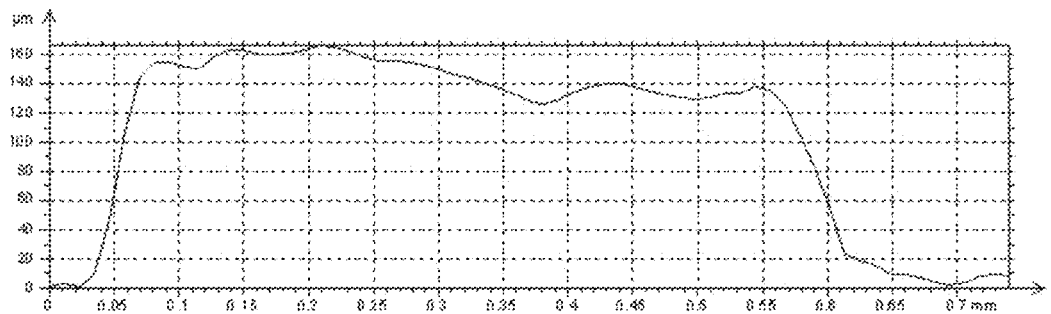
FIGS. 16A-16J provide profilometer scans of each of the shaped abrasive particles of conventional shaped abrasive particles.
Figure 16B:
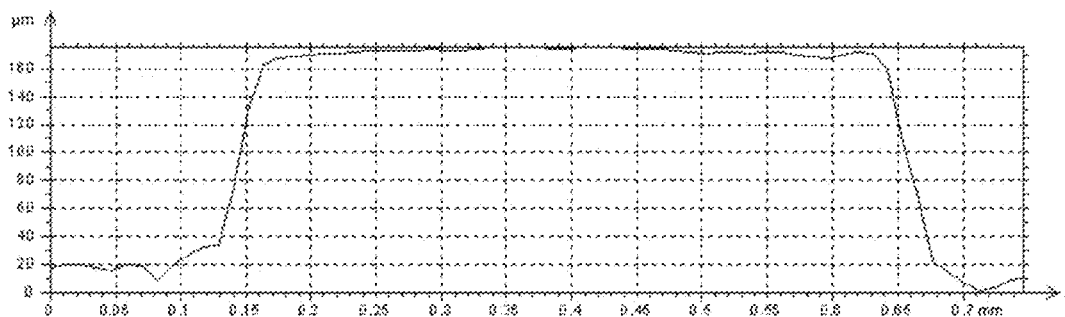
Figure 16C:
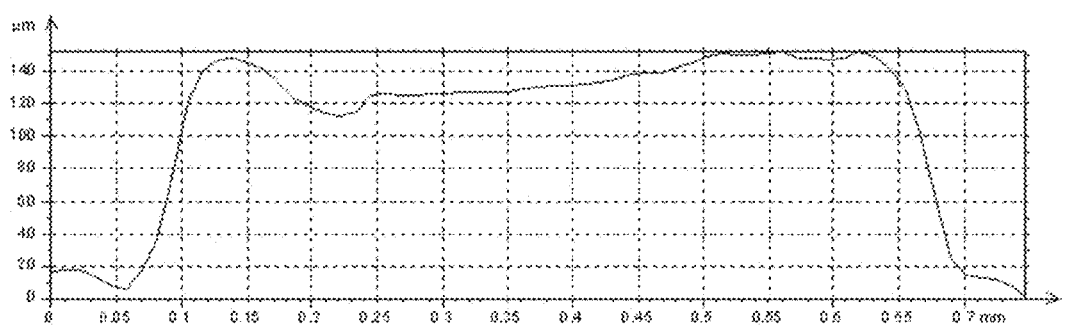
Figure 16D:
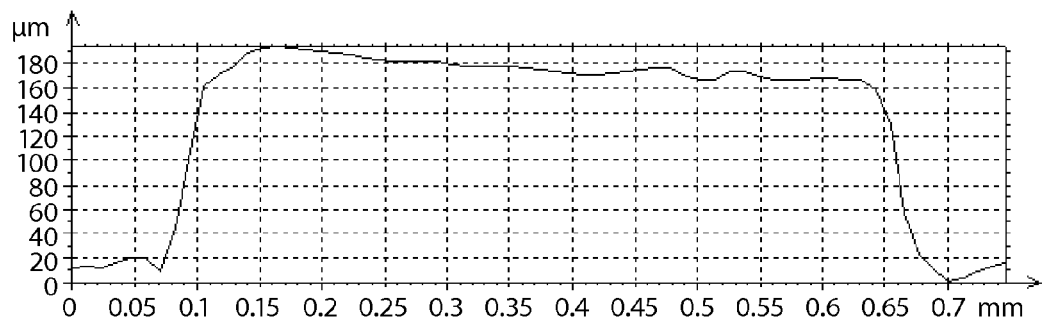
Figure 16E:
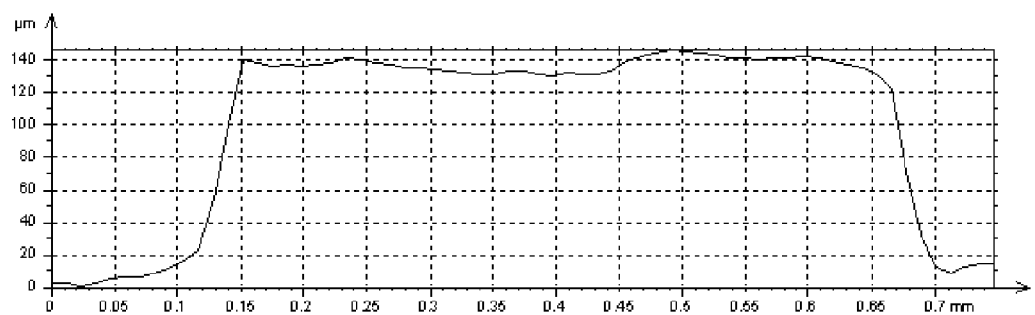
Figure 16F:
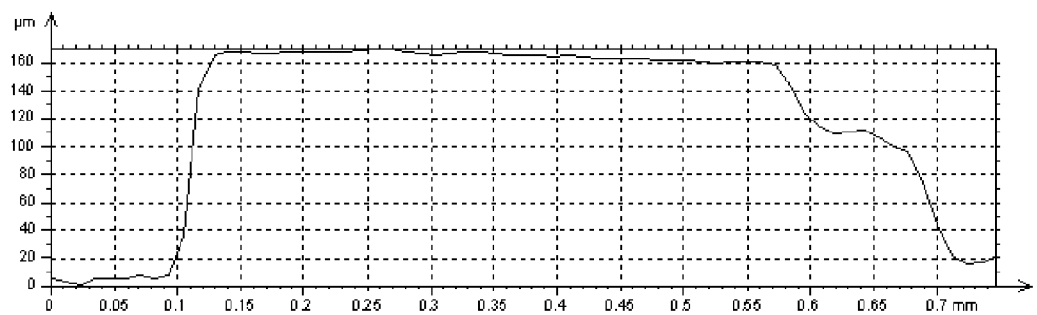
Figure 16G:
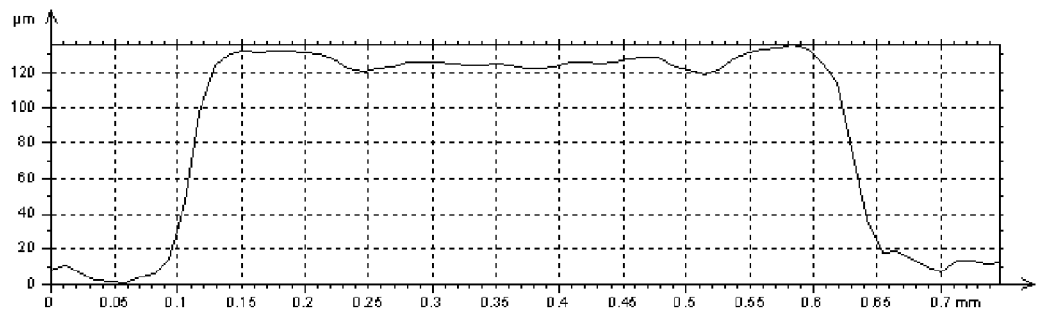
Figure 16H:
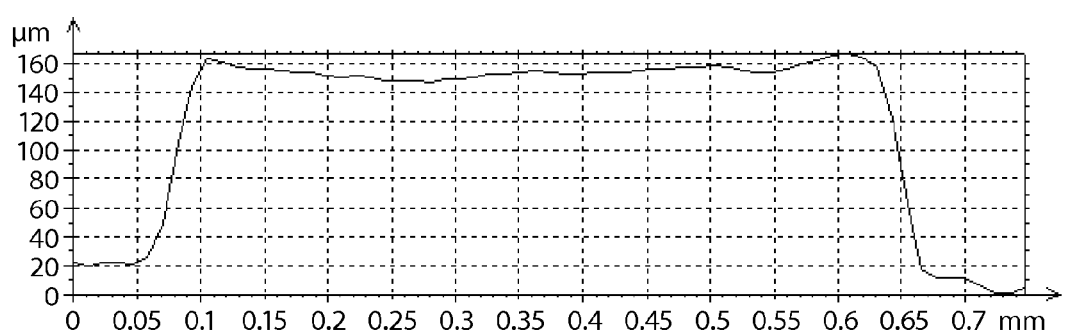
Figure 16I:
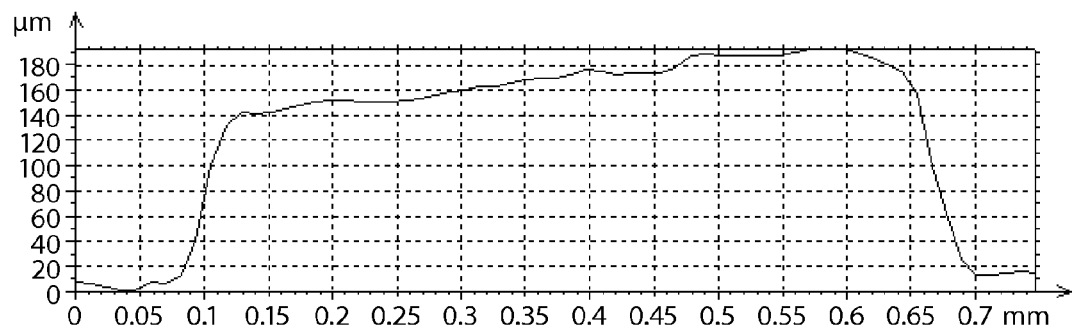
Figure 16J:
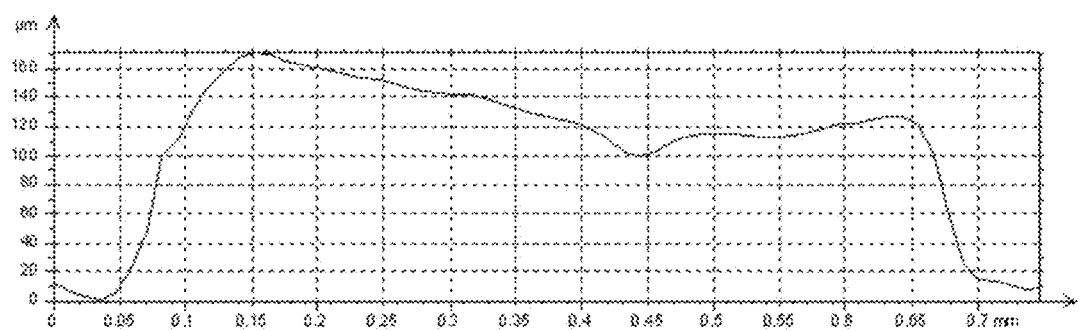
Figure 17A:
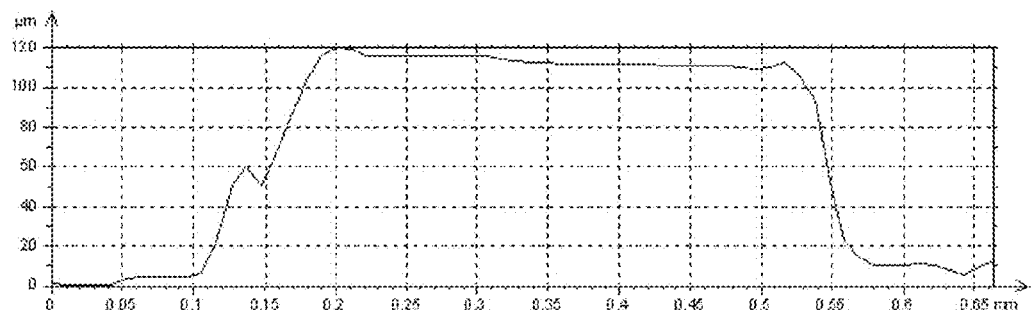
FIGS. 17A-17J provide profilometer scans of each of the shaped abrasive particles of conventional shaped abrasive particles.
Figure 17B:
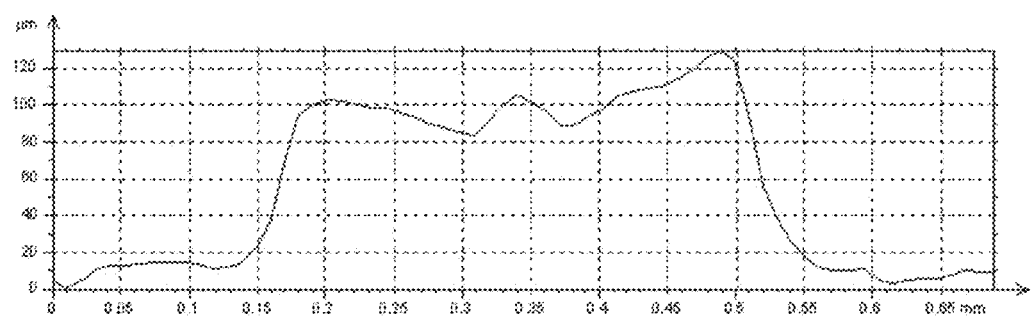
Figure 17C:
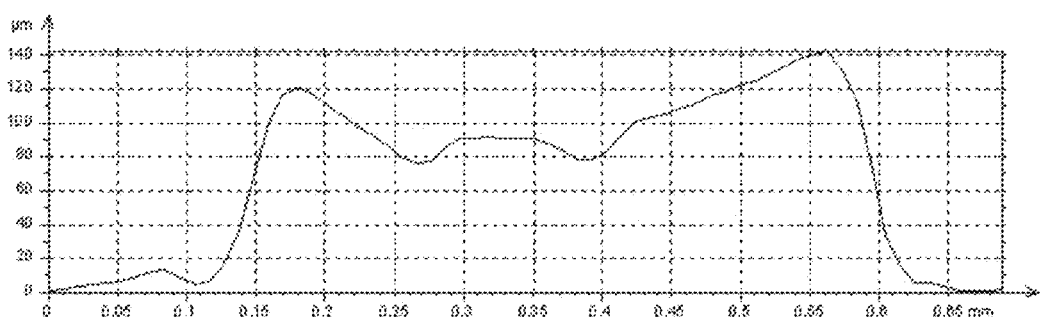
Figure 17D:
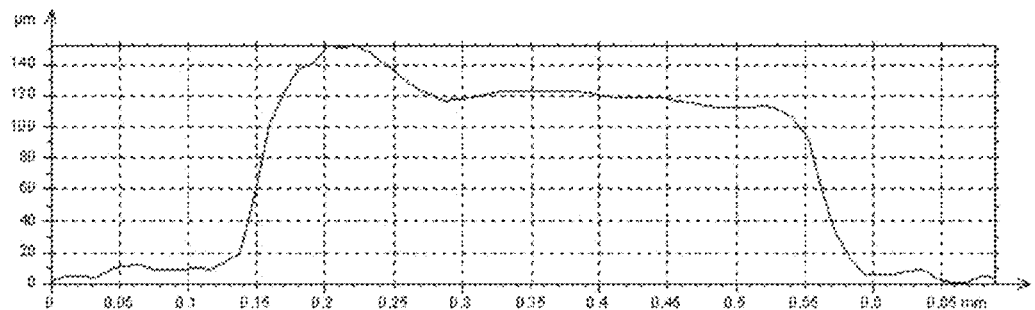
Figure 17E:
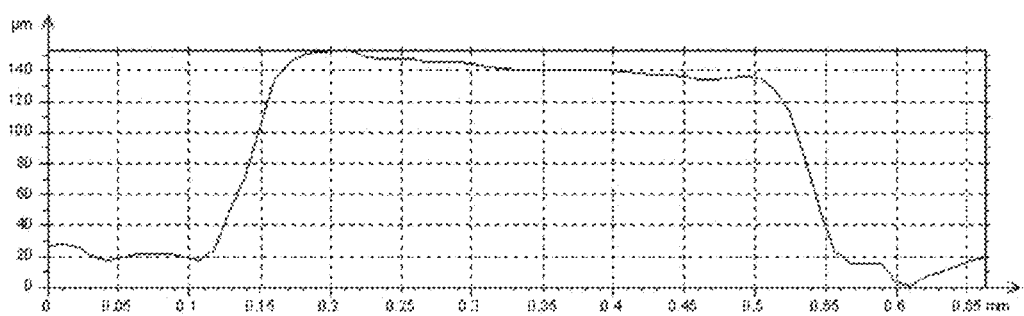
Figure 17F:
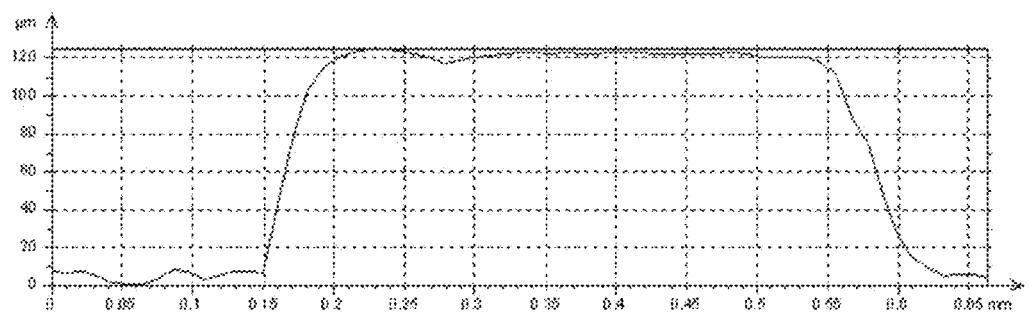
Figure 17G:
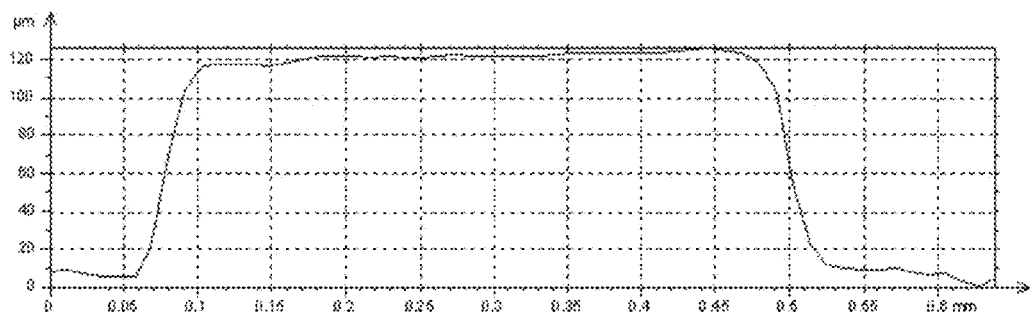
Figure 17H:
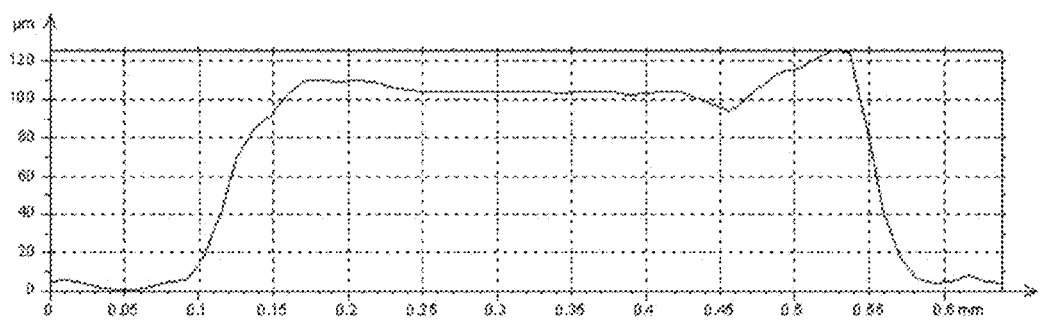
Figure 17I:
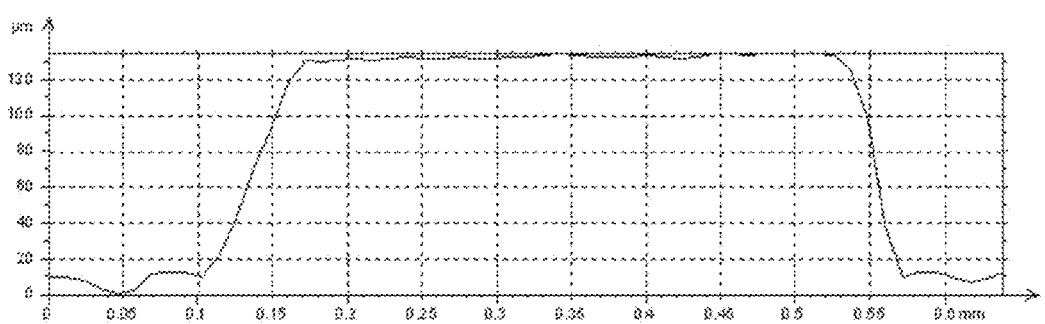
Figure 17J:
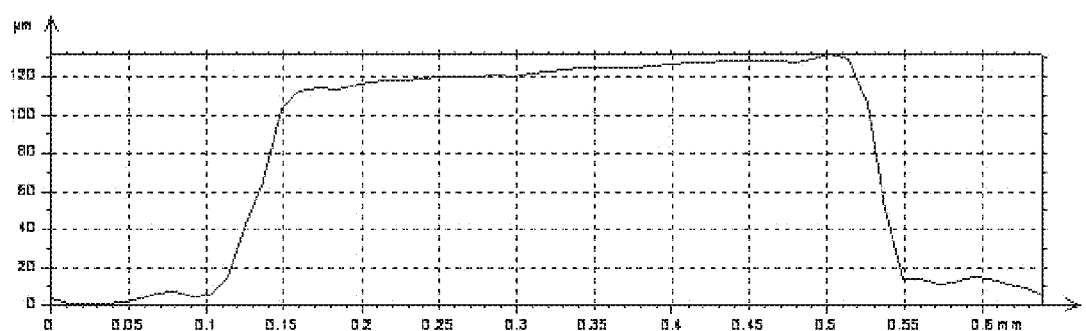

FIG. 13 includes a cross-sectional illustration of a coated abrasive article incorporating the abrasive particulate material in accordance with an embodiment. As illustrated, the coated abrasive 1300 can include a substrate 1301 and a make coat 1303 overlying a surface of the substrate 1301. The coated abrasive 1300 can further include abrasive particulate material 1306. The abrasive particulate material can include a first type of shaped abrasive particle 1305, a second type of abrasive particulate material 1307 in the form of diluent abrasive particles having a random shape, which may not necessarily be shaped abrasive particles. The coated abrasive 1300 may further include size coat 1304 overlying and bonded to the abrasive particulate materials 1305, 1306, 1307, and the make coat 1304.

According to one embodiment, the substrate 1301 can include an organic material, inorganic material, and a combination thereof. In certain instances, the substrate 1301 can include a woven material. However, the substrate 1301 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

The make coat 1303 can be applied to the surface of the substrate 1301 in a single process, or alternatively, the abrasive particulate materials 1306 can be combined with a make coat 1303 material and applied as a mixture to the surface of the substrate 1301. Suitable materials of the make coat 1303 can include organic materials, particularly polymeric materials, including for example, polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and mixtures thereof. In one embodiment, the make coat 1303 can include a polyester resin. The coated substrate can then be heated in order to cure the resin and the abrasive particulate material to the substrate. In general, the coated substrate 1301 can be heated to a temperature of between about 100° C. to less than about 250° C. during this curing process.

The abrasive particulate material 1306 can include shaped abrasive particles according to embodiments herein. In particular instances, the abrasive particulate material 1306 may include different types of shaped abrasive particles. The different types of shaped abrasive particles can differ from each other in composition, two-dimensional shape, three-dimensional shape, size, and a combination thereof as described in the embodiments herein. As illustrated, the coated abrasive 1300 can include shaped abrasive particles 1305 having a generally triangular two-dimensional shape according to shaped abrasive particles described in embodiments herein.

The other type of abrasive particles 1307 can be diluent particles different than the shaped abrasive particles 1305. For example, the diluent particles can differ from the shaped abrasive particles 1305 in composition, two-dimensional shape, three-dimensional shape, size, and a combination thereof. For example, the abrasive particles 1307 can represent conventional, crushed abrasive grit having random shapes. The abrasive particles 1307 may have a median particle size less than the median particle size of the shaped abrasive particles 1305.

In particular instances, as illustrated in FIG. 13, a plurality of the shaped abrasive particles 1305 in the abrasive article 1300 can be oriented in the same manner. Notably, the shaped abrasive particles 1305 can have an upright orientation, wherein the particles are resting on their respective bottom surfaces, which are the largest surface area regions, and the upper surface defining the ends of different height, is pointing away from the substrate 1301 and configured to contact a workpiece to conduct a material removal process. More particularly, the shaped abrasive particles 1305 can have an upright orientation wherein the bottom surface is in direct contact with the make coat 1303, and the upper surface of the shaped abrasive particles is in direct contact with an overlying coat, such as a size coat 1309. In accordance with an embodiment, a majority of the shaped abrasive particles 1305 within the abrasive article 1300 can be oriented in an upright orientation as illustrated in FIG. 13. More particularly, at least about 55% of the total number of shaped abrasive particles 1305 of the abrasive article 1300 can be oriented in an upright orientation. Still, in other instances, the percentage can be greater, such as at least about 60%, at least about 70%, at least about 80%, at least about 90%, or even at least about 95% of all shaped abrasive particles 1305 of the coated abrasive can have an upright orientation.

After sufficiently forming the make coat 1303 with the abrasive particulate material 1306, the size coat 1309 can be formed to overlie and bond the abrasive particulate material 1306 in place. The size coat 1309 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

The process of forming the abrasive particles of embodiments herein can include formation of the abrasive particles from a mixture. The mixture can be a mixture having certain materials and rheological characteristics that facilitate formation of the shape abrasive particles according to the embodiments herein. In certain instances, the mixture can be a slurry or gel. For example, the mixture can include a mixture of solid particles suspended in a liquid vehicle. In more particular embodiments, the mixture can be a sol gel including particulate matter mixed with a liquid vehicle, wherein the sol gel slurry comprises certain rheological characteristics, such that it is in the form of a dimensionally stable mixture. In particular, the mixture can be a gel formed of a ceramic powder material and a liquid, wherein the gel can be characterized as a shape-stable material having the ability to hold a given shape even in the green (i.e., unfired) state. In accordance with an embodiment, the gel can be formed of the ceramic powder material as an integrated network of discrete particles.

For example, the mixture can include an abrasive precursor material. An abrasive precursor material may be a material that can be formed into an abrasive particulate material through further processing, which may include for example, a process such as calcining. In accordance with an embodiment, the mixture can include an abrasive precursor that includes material such as oxides, borides, nitrides, carbides, oxynitrides, oxyborides, hydroxides, precipitated salts of nitrates, chlorides, sulphates, and a combination thereof. In particular instances, the abrasive precursor can include an alumina-based material, such as boehmite.

The term "boehmite" is generally used herein to denote alumina hydrates including mineral boehmite, typically being $Al_2O_3 \cdot H_2O$ and having a water content on the order of 15%, as well as psuedoboehmite, having a water content higher than 15%, such as 20-38% by weight. It is noted that boehmite (including psuedoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

The mixture can be formed to have a particular content of solid materials. For example, the mixture can be formed such that it includes at least about 5 wt % solids for the total weight of the mixture. In other instances, the amount of solids within the mixture can be greater, such as at least about 8%, at least about 10 wt %, at least about 12 wt %, at least about 15 wt %, at least about 18 wt %, at least about 20 wt %, at least about 25 wt %, at least about 30 wt %, at least about 35 wt %, at least about 40 wt %, at least about 50 wt %, or even at least about 55 wt %. Still, in particular instances, the solids content of the mixture can be not greater than about 90 wt %, such as not greater than about 85 wt %, not greater than about 75 wt %, not greater than about 70 wt %, not greater than about 65 wt %, not greater than about 55 wt %, or even not greater than about 50 wt % for the total weight of the mixture. It will be appreciated that the mixture can contain a solids content within a range between any of the minimum and maximum percentages noted above.

Moreover, the content of abrasive precursor material that makes up the total solid content of the abrasive mixture can be controlled. For example, the amount of abrasive precursor material can be at least about 40 wt % for the total weight of solids within the mixture. In other instances, the amount of abrasive precursor material for the total amount of solid material can be greater, such as at least about 42 wt %, at least about 46 wt % at least about 50 wt %, at least about 55 wt %, at least about 60 wt %, at least about 70 wt %, at least about 80 wt %, at least about 85 wt %, at least about 90 wt %, at least about 95 wt %, or even at least about 97 wt % of the total weight of the solids within the mixture. Certain slurries can be formed such that essentially the entire weight of solid material is abrasive precursor material.

In accordance with another embodiment the mixture can include a certain content of abrasive grains Abrasive grains are distinct from abrasive precursor material, as abrasive grains represent the finally-formed phase of abrasive grains. For certain slurries, the abrasive grains may be present as a seed material, which may facilitate a phase change of abrasive precursor material also included within the mixture during later processing.

In some instances, the mixture can contain a minor amount of abrasive grains, including for example, less than about 20 wt %, less than about 10 wt %, or even less than about 5 wt %.

However, particular slurries can be formed such that they contain a greater content of abrasive grains. For example, a mixture can contain a majority content of abrasive grains. Notably, the mixture can contain a content of abrasive grains that is the same as the content of abrasive precursor material for the total weight of solids within the mixture as noted above.

The abrasive grains can include materials such as oxides, borides, nitrides, carbides, oxynitrides, oxyborides, diamond, and a combination thereof. Certain abrasive grains include alumina, silicon carbide, alumina/zirconia and cubic boron nitride (i.e. cBN). In more particular instances, the mixture can include abrasive grains that are made of alumina, and more particularly, may consist essentially of alumina. In one instance, the abrasive grains consist essentially of alpha alumina. It is to be understood however that the invention is not so limited but is capable of being adapted for use with a plurality of different abrasive materials.

The mixture may contain a certain content of solid material, liquid material, and additives such that it has suitable rheological characteristics for use with the process detailed herein. That is, in certain instances, the mixture can have a certain viscosity, and more particularly, suitable rheological characteristics that form a dimensionally stable phase of material that can be formed through the process as noted herein. A dimensionally stable phase of material is a material that can be formed to have a particular shape and maintain the shape such that the shape is present in the finally-formed object.

Furthermore, the mixture can be formed to have a particular content of liquid material. Some suitable liquids may include organic materials, such as water. In accordance with one embodiment, the mixture can be formed to have a liquid content less than the solids content of the mixture. In more particular instances, the mixture can have a liquid content of at least about 25 wt % for the total weight of the mixture. In other instances, the amount of liquid within the mixture can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 60 wt %, or even not greater than about 65 wt %. It will be appreciated that the content of the liquid in the mixture can be within a range between any of the minimum and maximum percentages noted above.

Furthermore, to facilitate processing and forming shaped abrasive particles according to embodiments herein, the mixture can have a particular storage modulus. For example, the mixture can have a storage modulus of at least about $1 \times 10^4$ Pa, such as at least about $4 \times 10^4$ Pa, or even at least about $5 \times 10^4$ Pa. However, in at least one non-limiting embodiment, the mixture may have a storage modulus of not greater than about $1 \times 10^7$ Pa, such as not greater than about $1 \times 10^6$ Pa. It will be appreciated that the storage modulus of the mixture can be within a range between any of the minimum and maximum values noted above. The storage modulus can be measured via a parallel plate system using ARES or AR-G2 rotational rheometers, with Peltier plate temperature control systems. For testing, the mixture can be extruded within a gap between two plates that are set to be approximately 8 mm apart from each other. After extruding the get into the gap, the distance between the two plates defining the gap is reduced to 2 mm until the mixture completely fills the gap between the plates. After wiping away excess mixture, the gap is decreased by 0.1 mm and the test is initiated. The test is an oscillation strain sweep test conducted with instrument settings of a strain range between 01% to 100%, at 6.28 rad/s (1 Hz), using 25-mm parallel plate and recording 10 points per decade. Within 1 hour after the test completes, lower the gap again by 0.1 mm and repeat the test. The test can be repeated at least 6 times. The first test may differ from the second and third tests. Only the results from the second and third tests for each specimen should be reported.

Moreover, the mixture can be formed to have a particular content of organic materials, including for example, organic additives that can be distinct from the liquid, to facilitate processing and formation of shaped abrasive particles according to the embodiments herein. Some suitable organic additives can include stabilizers, binders, such as fructose, sucrose, lactose, glucose, UV curable resins, and the like.

Moreover, the mixture can be formed to have a particular content of acid or base distinct from the liquid, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, ammonium citrate. According to one particular embodiment, the mixture can have a pH of less than about 5, and more particularly, within a range between about 2 and about 4, using a nitric acid additive.

In accordance with an embodiment, the process of forming the abrasive particles of the embodiments herein includes a process of forming the mixture into a particular shape. Some suitable forming methods can include molding, extruding, casting, printing, rolling, stamping, punching, swiping, blading, and a combination thereof. In one particular instance, the process of forming the mixture into a shaped abrasive particle having the features of the embodiments herein can include depositing the mixture onto a substrate. Deposition of the mixture onto a substrate can include a printing process, and more particularly, a screen printing process.

Figure 11:
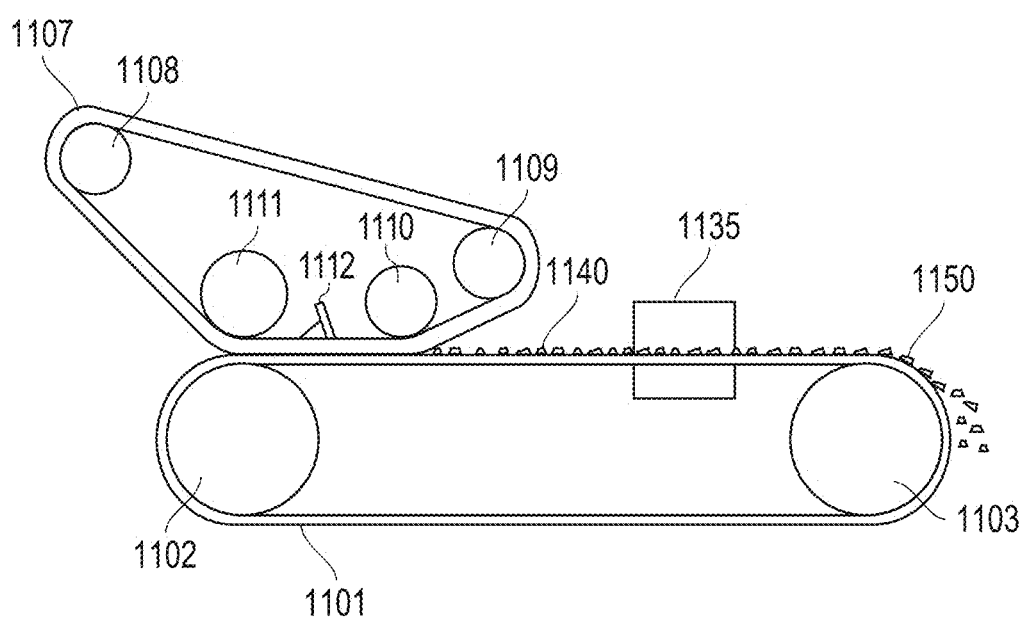
FIG. 11 includes a diagram of a screen printing process for forming an abrasive particle in accordance with an embodiment.

FIG. 11 includes a diagram of a screen printing process in accordance with an embodiment. As illustrated, the process of forming an abrasive article can include providing a mixture on a surface of a substrate 1101, which may also be referred to as a belt. Notably, the substrate 1101 can be translated between spools 1102 and 1103, such that the substrate 1101 can act as a conveyor belt, configured to translate the through certain processes, which facilitates the formation of the abrasive particles 1150. In accordance with an embodiment, the substrate 1101 can be translated relative to a deposition region where the mixture can be placed on the surface of the substrate 1101.

While not illustrated in particular, the screen printing system can utilize a die having a reservoir configured to contain the mixture to be printed and formed into shaped abrasive particles. The mixture may be placed under a force (or pressure) to facilitate extrusion of the mixture through a die opening and into openings in a printing screen 1107 and onto the translating substrate 1101 underlying the printing screen 1107.

The printing screen 1107 can have a plurality of openings extending through the volume of the substrate 1101. In accordance with an embodiment, the openings can have a two-dimensional shape as viewed in a plane defined by the length (l) and width (w) of the substrate 1101 that include various shapes, for example, polygons, ellipsoids, numerals, Greek alphabet letters, Latin alphabet letters, Russian alphabet characters, complex shapes including a combination of polygonal shapes, and a combination thereof. In particular instances, the openings may have two-dimensional polygonal shapes such as, a triangle, a rectangle, a quadrilateral, a pentagon, a hexagon, a heptagon, an octagon, a nonagon, a decagon, and a combination thereof.

After forcing the mixture through the die opening and through the openings in the printing screen 1107, precursor shaped abrasive particles may be printed on a substrate 1101 disposed under the printing screen 1107. According to a particular embodiment, the precursor shaped abrasive particles 423 can have a shape substantially replicating the shape of the openings, and at least a two-dimensional shape substantially replicating the shape of the openings as viewed in a plane defined by the length and width of the printing screen 1107. Notably, the average residence time of the mixture within the openings of the printing screen 1107 can be less than about 2 minutes, less than about 1 minute, less than about 40 second, or even less than about 20 seconds. In one non-limiting embodiment, the mixture may be substantially unaltered during printing, and more particularly, may experience no appreciable loss of volatile materials or drying in the openings of the printing screen 1107.

The mixture can be deposited through an aperture and onto the substrate 1101 in the manner of a screen printing process, as illustrated in FIG. 11. Some particulars of the screen printing process are provided in U.S. Pat. No. 6,054,093, which is incorporated in its entirety herein.

In particular, the screen printing process can utilize a printing screen 1107 in the form of a continuous printing belt that can pass around a series of rolls 1108, 1109, 1110, and 111, with the space between certain rolls defining zones within the printing process. For example, the screen printing process can utilize an application zone, a disengagement zone, a cleaning zone, and a treatment zone. In the application zone, defined as the region between the rolls 1110 and 1111, the screen can be held in firm contact with the substrate 1101 while the screen and the substrate 1101 move in the same direction at essentially the same speed and the mixture is applied to the inside surface of the screen, ahead of a doctor blade 1112. The passage beneath the doctor blade 1112 forces the mixture into the apertures in the screen printing belt, which at that point, is in firm contact with the substrate 1101. While a doctor blade 1112 is illustrated, in certain instances, a doctor blade may not be used.

In the disengagement zone between the rolls 1110 and 1109, the screen printing belt can be disengaged from the substrate 1101 leaving the screen printed shapes 1140 on the surface of the substrate 1101.

After extruding the mixture through the openings of the screen 1107, the substrate 1101 and screen 1107 may be translated to a disengagement zone, wherein the belt 109 and screen 151 can be separated from each other to facilitate the formation of precursor shaped abrasive particles. In accordance with an embodiment, the screen 151 and belt 109 may be separated from each other within the disengagement zone at a particular release angle. In accordance with specific embodiment, the release angle can be a measure of the angle between a lower surface of the screen 1107 and an upper surface of the belt 1101.

In accordance with an embodiment, the release angle may be particularly controlled to facilitate suitable formation of shaped abrasive particles having one or a combination of features described herein. For example, in accordance with an embodiment, the release angle can be at least about 15° and not greater than about 45°. In more particular instances, the release angle may be at least about 18°, such as at least about 20°, at least about 22°, at least about 24°, or even at least about 26°. Still, however the release angle may be not greater than about 42°, such as not greater than about 40°, not greater than about 38°, or even not greater than about 36°. It will be appreciated that the release angle can be within a range between any of the minimum and maximum values noted above.

The shapes 1140 can be transported by the substrate 1101 to further processing zones, including for example processing zone 1135. Certain suitable processes, which can be undertaken in the processing zone 1135 can include drying, heating, curing, reacting, radiating, mixing, stirring, agitating, planarizing, calcining, sintering, comminuting, sieving, and a combination thereof. In one particular embodiment, the processing zone 1135 includes a drying process, wherein moisture is withdrawn from the shapes 1140 to improve the structural integrity of the particles for handling and further processing.

Meanwhile the screen printing belt 1107, after leaving the disengagement zone, can pass through a cleaning zone between the rolls 1109 and 1108. In the cleaning zone, the screen printing belt 1107 can be cleaned and readied for use again. The cleaning process can include drying, directed brushes, air blasts, and combinations of such processes.

From the cleaning zone, the screen printing belt can pass to the treatment zone, in which a release agent may, if desired, be applied to ease the separation of the shapes 1140 from the screen printing belt 1107 in the disengagement zone.

Before the substrate 1101 enters the application zone in contact with the screen printing belt 1107, it may be given a release treatment, (such a fluorocarbon spray), if the substrate 1101 has not been pre-treated to give it a baked-on release layer.

As illustrated, after conducting the forming process, the shapes 1140 can be transported by the substrate 1101 to the processing zone 1135. In addition to the processes noted above, the shapes 1140 can be treated within the processing zone 1135 utilizing one or more processes such as drying, heating, curing, reacting, radiating, mixing, stirring, agitating, planarizing, calcining, sintering, comminuting, sieving, texturing, and a combination thereof. In one particular instance, the treating process can include a process that changes the rheology of the mixture. The process of changing the rheology of the mixture can facilitate the formation of a dimensionally stable phase of material such that the texture formed in the mixture is maintained and part of the finally-formed abrasive particles 1150.

Certain processes, such as drying, heating, curing, calcining, and sintering, may be conducted to remove liquid materials from the mixture and solidify and stiffen the shapes 1140. According to at least one embodiment, the treating process includes texturing at least one surface of the shapes 1140 to form textured features in the finally-formed abrasive particles. Furthermore, a process of comminuting (i.e., crushing) may also be undertaken to facilitate the formation of the finally-formed abrasive particles 113.

The abrasive particles of the embodiments herein include features that can be formed using modifications to certain forming processes. For example, the abrasive grains can be formed to have one or a combination of features disclosed herein utilizing a modification to the screen printing process, wherein modifications to the process impart particular features to the abrasive particles. For example, during printing, the screen can be moved in a particular manner to form features, such as the tilted upper surface of the abrasive particles herein. In accordance with an embodiment, the process of printing can include lifting the screen at an angle relative to the planar surface of the substrate on which the mixture is printed. In particular instances, the screen can also be lifted in a twisting manner relative to the planar surface of the substrate to form the tilted upper surface of the abrasive particles herein. Notably, in such embodiments, the mixture can be in the form of a dimensionally stable mixture wherein features provided to the mixture during forming are maintained throughout processing.

In addition to the process of printing the particles to form the features noted herein, further processing can be conducted on the abrasive particles. For example, a process of texturing can be conducted after forming the abrasive particles to facilitate formation of texture within the upper surface, and/or any other surfaces of the abrasive particles herein. Certain suitable texturing operations can include embossing, etching, thermal treatment, radiation treatment, chemical treatment, sonic treatment, magnetic treatment, molding, pressing, punching, and a combination thereof. In particular instances, the shapes 1140 can be textured by contacting a texturing form to a surface of the shapes 1140. Texturing using a texturing form can include processes such as rolling, stamping, punching, swiping, blading, and a combination thereof.

Notably, the abrasive particles of the embodiments herein utilize a combination of features not recognized or utilized in conventional abrasive particles. Such features include, particular polyhedral shapes, contour of sides of the abrasive particles, variations in height and width of the abrasive particles, textured surfaces, and a combination thereof. Moreover, the embodiments herein can utilize particular forming processes to facilitate the formation of abrasive grains having one or a combination of the features noted above. The combination of features facilitates resilient abrasive particles that can readily be incorporated into a wide variety of abrasive articles, including coated abrasive articles and/or bonded abrasive articles. The description is not intended to set forth a hierarchy of features, but different features that can be combined in one or more manners to define the invention.

Example 1

A first batch of shaped abrasive particles are made using a screen printing process. A mixture, which is in the form of a gel, is initially made including 42 wt % boehmite commercially available as Catapal B from Sasol Corporation, 1 wt % sub-micron alpha alumina with respect to final alpha alumina content in the body wherein the sub-micron alpha alumina has a BET surface area greater than 120 $m^2/g$ and 2 to 4 wt % nitric acid. The mixture is extruded through a die opening and through a screen having triangular shaped openings. The triangular shaped openings have a side length of 2.38 mm and a depth of 625 microns minimum. No release agent is provided on the interior surfaces of the screen that define the openings. The screen was moved at a rate of approximately 1 feet/min and was released from the underlying belt at an angle of approximately 10° to 60°. The approximate resident time of the mixture in the openings is less than 10 seconds. Shaped abrasive precursor particles are formed on the belt underlying the screen and then dried at a temperature of 95° C. for a duration of approximately 4-7 minutes. The dried particles are gathered and calcined at a temperature of 1000° C. for a duration of 10 min and then sintered at a temperature of approximately 1300° C. for a duration of 10 to 30 min. The finally-formed shaped abrasive particles consist essentially of alpha alumina and have a median crystal size of 0.1 to 0.5 microns, and particle size of 1.3 to 1.5 mm in length.

A first sample (S1) of randomly selected shaped abrasive particles is taken from the batch and analyzed via using a STIL (Sciences et Techniques Industrielles de la Lumiere—France) Micro Measure 3D Surface Profilometer (white light (LED) chromatic aberration technique) to determine the average height difference, normalized height difference, and height variation. Each of the shaped abrasive particles of the sample are analyzed and the dimensions (i.e., h1 and h2) are recorded. FIGS. 14A-14J provide profilometer scans of each of the shaped abrasive particles of sample 1. The average height difference for sample S1 is approximately 114 microns, the height variation is approximately 120, and the normalized height difference approximately 81. The average profile length of the first sample is calculated to be approximately 1.3 mm, and thus the profile ratio of the sample is 0.088 (i.e., [0.114/1.3]).

Example 2

A second batch is made according to Example 1, except that the finally-formed shaped abrasive particles have a median particle size of 1.2 to 1.5 mm in length.

Figure 19:
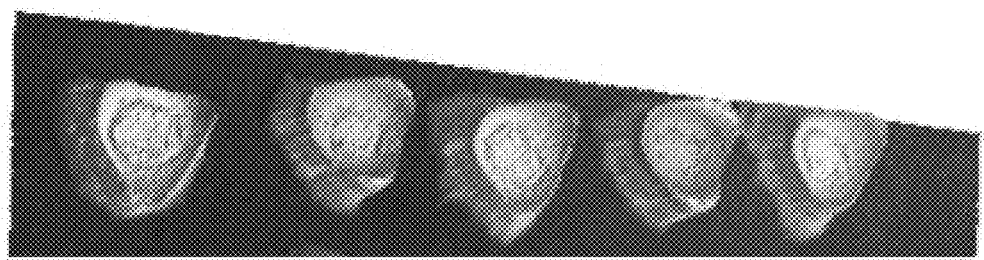
FIG. 19 includes a picture of shaped abrasive particles according to an embodiment.

A second sample (S2) of randomly selected shaped abrasive particles is taken from the second batch and analyzed via using a STIL (Sciences et Techniques Industrielles de la Lumiere—France) Micro Measure 3D Surface Profilometer (white light (LED) chromatic aberration technique) to determine the average height difference, normalized height difference, and height variation. Each of the shaped abrasive particles of the sample are analyzed and the dimensions (i.e., h1 and h2) are recorded. FIGS. 15A-15J provide profilometer scans of each of the shaped abrasive particles of sample 2. The average height difference for sample S2 is about 82 microns, the height variation is approximately 48, and the normalized height difference is approximately 66. The average profile length of the sample is calculated to be approximately 1.2 mm, and thus the profile ratio of the sample is 0.068 (i.e., [0.082/1.2]). FIG. 19 includes a picture of actual shaped abrasive particles formed according to Example 2. Notably, the shaped abrasive particles of FIG. 19 have generally triangular two-dimensional shapes, demonstrate ellipsoid regions within the upper surfaces, and further demonstrate significant height difference features across their upper surfaces.

Example 3

Shaped abrasive grains available from 3M were obtained to conduct comparative analysis. A first comparative sample (CS3) is available as Cubitron I having an average grit size of 36+. A second comparative sample (CS4) is available as Cubitron II having an average grit size of 60+. A third comparative sample (CS5) is available as Cubitron II having an average grit size of 80+. Each of the shaped abrasive particles of sample CS3 are analyzed and the dimensions (i.e., h1 and h2) are recorded. The average height difference for sample CS3 is about 40 microns, the height variation is approximately 27, and the normalized height difference is approximately 33. In one analysis, the average profile length of the sample is calculated to be approximately 1.2 mm, and thus the profile ratio of the sample is 0.033 (i.e., [0.040/1.2]). In another analysis, the average profile length of the sample is approximately 1.4 mm, and thus the profile ratio of the sample is 0.028 (i.e., [0.040/1.4]).

Each of the shaped abrasive particles of sample CS4 are analyzed and the dimensions (i.e., h1 and h2) are recorded. FIGS. 16A-16J provide profilometer scans of each of the shaped abrasive particles of sample CS4. The average height difference for sample CS4 is about 30 microns, the height variation is approximately 18, and the normalized height difference is approximately 23. The average profile length of the sample is calculated to be approximately 0.65 mm, and thus the profile ratio of the sample is 0.028 (i.e., [0.018/0.65]).

The shaped abrasive particles of sample CS5 are analyzed and the dimensions (i.e., h1 and h2) are recorded. FIGS. 17A-17J provide profilometer scans of each of the shaped abrasive particles of sample CS5. The average height difference for sample CS5 is about 17 microns, the height variation is approximately 11, and the normalized height difference is approximately 14. The average profile length of the sample is calculated to be approximately 0.50 mm, and thus the profile ratio of the sample is 0.022 (i.e., [0.011/0.50]).

Clearly, upon comparison of the figures and data, the shaped abrasive grains of the comparative examples are significantly different in terms of height variation. In fact, upon inspection, it is evident that the comparative shaped abrasive particles are not formed to achieve height variation between ends of the particles, and rather "shape correctness" appears to be the preferred focus.

Example 5

The shaped abrasive particles of S1 and comparative shaped abrasive particles of sample CS3 tested in a single grit scratch test. The shaped abrasive particles are laid on their bottom surface, which is a major surface having the greatest surface area. For the shaped abrasive particles of sample S1, the particles are oriented in an upright position, representative of a preferred orientation for use in an abrasive article. In a single grit (i.e., shaped abrasive particle) scratch test, a single grit is held in a grit holder by a bonding material of epoxy. The grit is moved across a workpiece of 304 stainless steel for a scratch length of 8 inches using a wheel speed of 22 m/s and an initial scratch depth of 30 microns. The grit produces a groove in the workpiece having a cross-sectional area ($A_R$). Each shaped abrasive particle completes 15 passes across the 8 inch length, for each sample 10 individual particles are tested and the results are analyzed and averaged. The change in the cross-sectional area of the groove from beginning to the end of the scratch length is measured to determine the grit wear.

Figure 18A:
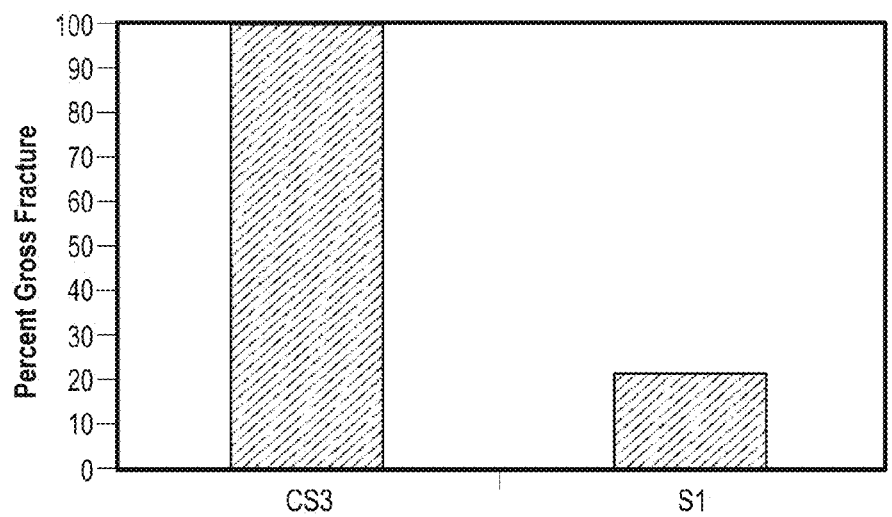
FIGS. 18A and 18B provide the test results of a single grit scratching test.
Figure 18B:
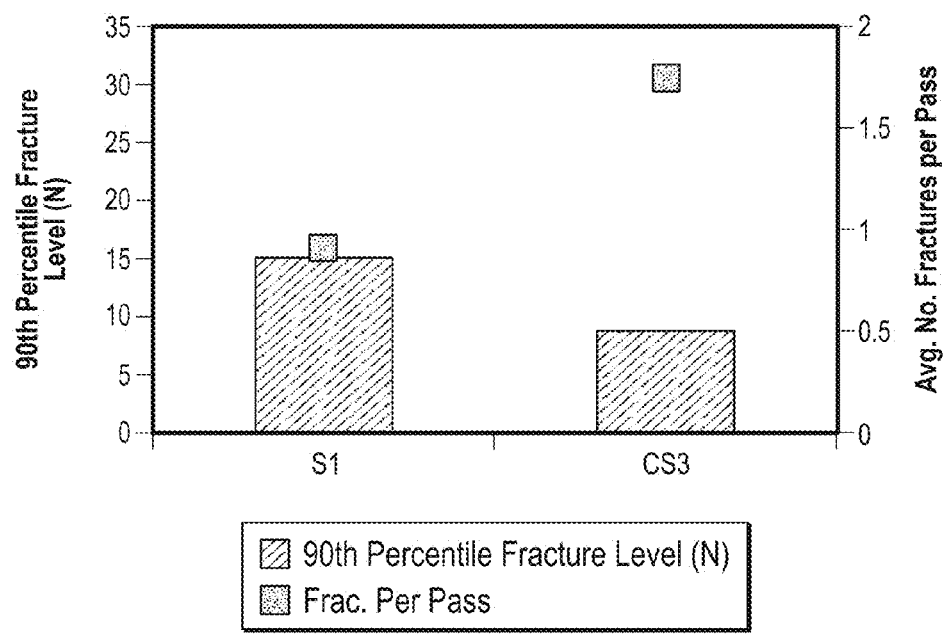

FIGS. 18A and 18B provide the test results of a single grit scratching test. Clearly, and quite unexpectedly, the shaped abrasive particles of the embodiments herein demonstrated significantly improved performance over the comparative sample. Notably, in terms of the measured percent gross fracture, the shaped abrasive particles of sample S1 demonstrated a 300% improvement over the comparative sample. Additionally, with respect to the measured fracture level, the shaped abrasive particles of the embodiments herein demonstrated a significant improvement over the shaped abrasive particles of the comparative example. In particular, the shaped abrasive particles of sample S1 had a 50% reduction in fractures per pass over the comparative sample. Moreover, the shaped abrasive particles of sample S1 had nearly a 100% improvement of $90^{th}$ percentile fracture level (N) over the comparative sample.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. An abrasive article comprising:
a shaped abrasive particle comprising a body having a first height (h1) at a first end of the body defining a corner between an upper surface, a first side surface, and a second side surface, and a second height (h2) at a second end of the body opposite the first end defining an edge between the upper surface and a third side surface, wherein the body comprises a normalized height difference defined by the equation $[(h1-h2)/(h1/h2)]$ of at least about 40 microns, wherein h1 is greater than h2;
wherein at least a portion of the upper surface has a curvilinear contour; and
wherein the body comprises a bottom surface opposite the upper surface and having a substantially planar contour, wherein the bottom surface has a greater surface area relative to the upper surface.

2. The abrasive article of claim 1, wherein the bottom surface comprises a surface area defined as a bottom area (Ab) and the body has a cross-sectional midpoint area (Am) defining an area of a plane perpendicular to the bottom area and extending through a midpoint of the shaped abrasive particle, and wherein the body comprises an area ratio of bottom area to midpoint area (Ab/Am) of not greater than about 6.

3. The abrasive article of claim 1, wherein the body comprises a normalized height difference of at least about 43 microns.

4. The abrasive article of claim 1, wherein the body comprises a normalized height difference of not greater than about 200 microns.

5. The abrasive article of claim 1, wherein an average difference in height between the first height and the second height is at least about 50 microns.

6. The abrasive article of claim 5, wherein the average difference in height is not greater than about 300 microns.

7. The abrasive article of claim 1, wherein the body comprises a length and a width, and wherein the body comprises a primary aspect ratio of length:width of at least about 1:1 and not greater than about 10:1.

8. The abrasive article of claim 7, wherein the body comprises a height, and wherein the body comprises a secondary aspect ratio defined by a ratio of width:height within a range between about 5:1 and about 1:3.

9. The abrasive article of claim 8, wherein the body comprises a tertiary aspect ratio defined by a ratio of length:height within a range between about 6:1 and about 1.5:1.

10. The abrasive article of claim 1, wherein the shaped abrasive particle comprises an average difference in height [h1−h2] and a profile length ($l_p$), and wherein the shaped abrasive particle comprises a profile ratio defined by the equation $[(h1-h2)/(l_p)]$ of not greater than about 0.3.

11. The abrasive article of claim 1, wherein the shaped abrasive particle is part of a sample of shaped abrasive particles comprising a plurality of individual shaped abrasive particles, each individual shaped abrasive particle having a body having a first height (h1) at a first end of the body and a second height (h2) at a second end of the body opposite the first end, wherein h1 and h2 are significantly different relative to each other, and wherein the sample comprises a height variation of at least about 20 microns.

12. The abrasive article of claim 11, wherein the sample comprises at least about 5 randomly-selected shaped abrasive particles made in a single forming process.

13. The abrasive article of claim 11, wherein the height variation is not greater than about 180 microns, not greater than about 150 microns, not greater than about 130 microns.

14. The abrasive article of claim 1, wherein the body comprises a rake angle defined as the angle between the first side surface and the bottom surface and wherein the rake angle comprises a value within a range between about 1° and about 80°.

15. The abrasive article of claim 1, wherein the body comprises a substantially trapezoidal two-dimensional shape as viewed in a plane defined by a length and a width of the body.

16. The abrasive article of claim 1, wherein the body comprises a polycrystalline material.

17. The abrasive article of claim 1, wherein the body comprises a triangular two-dimensional shape as viewed in a plane defined by a length and a width of the body.

18. The abrasive article of claim 1, wherein the body comprises abrasive grains selected from the group of materials consisting of nitrides, oxides, carbides, borides, oxynitrides, diamond, and a combination thereof.

19. The abrasive article of claim 1, wherein the shaped abrasive particle is incorporated into a coated abrasive article or a bonded abrasive article.

20. The abrasive article of claim 19, wherein the shaped abrasive particle is applied to a substrate of the coated abrasive article.

21. The abrasive article of claim 1, wherein the upper surface comprises at least one depression.

\* \* \* \* \*